US011983989B2

(12) United States Patent
Nguyen et al.

(10) Patent No.: US 11,983,989 B2
(45) Date of Patent: May 14, 2024

(54) CONFIGURABLE VIRTUAL GAMING ZONE

(71) Applicant: Aristocrat Technologies, Inc. (ATI), Las Vegas, NV (US)

(72) Inventors: Binh T. Nguyen, Reno, NV (US); Darrell Rilett, Boulder, CO (US)

(73) Assignee: Aristocrat Technologies, Inc. (ATI), Las Vegas, NV (US)

( * ) Notice: Subject to any disclaimer, the term of this patent is extended or adjusted under 35 U.S.C. 154(b) by 104 days.

(21) Appl. No.: 17/511,532

(22) Filed: Oct. 26, 2021

(65) Prior Publication Data

US 2022/0139152 A1 May 5, 2022

Related U.S. Application Data

(63) Continuation of application No. 15/427,308, filed on Feb. 8, 2017, now abandoned, which is a continuation (Continued)

(51) Int. Cl.

| | |
|---|---|
| ***A63F 9/24*** | (2006.01) |
| ***G07F 17/32*** | (2006.01) |
| *G07F 17/34* | (2006.01) |

(52) U.S. Cl.

CPC ........ *G07F 17/323* (2013.01); *G07F 17/3209* (2013.01); *G07F 17/3211* (2013.01); *G07F 17/3218* (2013.01); *G07F 17/3223* (2013.01); *G07F 17/3225* (2013.01); *G07F 17/3227* (2013.01); *G07F 17/3241* (2013.01); *G07F 17/326* (2013.01); *G07F 17/3272* (2013.01);

(Continued)

(58) Field of Classification Search

None

See application file for complete search history.

(56) References Cited

U.S. PATENT DOCUMENTS

| | | | |
|---|---|---|---|
| 2,033,638 | A | 3/1936 | Koppl |
| 2,062,923 | A | 12/1936 | Nagy |

(Continued)

FOREIGN PATENT DOCUMENTS

| | | |
|---|---|---|
| GB | 2033638 | 5/1980 |
| GB | 2062923 | 5/1981 |

(Continued)

OTHER PUBLICATIONS

Advisory Action for U.S. Appl. No. 13/632,828, dated Feb. 25, 2016.

(Continued)

*Primary Examiner* — Lawrence S Galka

(74) *Attorney, Agent, or Firm* — McAndrews, Held & Malloy, Ltd.

(57) ABSTRACT

In one embodiment, zone-based gaming activity within a gaming establishment can be configured. The method can, for example, include: setting a location within the gaming establishment for the zone-based gaming activity, the location being at least one defined region within the gaming establishment; configuring a virtual gaming zone for the location within the gaming establishment for the zone-based gaming activity; identifying one or more gaming devices that are within the virtual gaming zone; and permitting the identified one or more gaming devices that are within the virtual gaming zone to participate in the zone-based gaming activity.

20 Claims, 5 Drawing Sheets

Related U.S. Application Data of application No. 13/801,271, filed on Mar. 13, 2013, now Pat. No. 9,607,474.

(52) U.S. Cl.
CPC ...... *G07F 17/3206* (2013.01); *G07F 17/3232* (2013.01); *G07F 17/3255* (2013.01); *G07F 17/34* (2013.01)

(56) References Cited

U.S. PATENT DOCUMENTS

| | | | |
|---|---|---|---|
| 4,741,539 | A | 5/1988 | Sutton et al. |
| 4,948,138 | A | 8/1990 | Pease et al. |
| 4,969,183 | A | 11/1990 | Reese |
| 5,067,712 | A | 11/1991 | Georgilas |
| 5,275,400 | A | 1/1994 | Weingardt |
| 5,429,361 | A | 7/1995 | Raven et al. |
| 5,489,103 | A | 2/1996 | Okamoto |
| 5,618,232 | A | 4/1997 | Martin |
| 5,630,757 | A | 5/1997 | Gagin |
| 5,655,961 | A | 8/1997 | Acres et al. |
| 5,704,835 | A | 1/1998 | Dietz, II |
| 5,727,786 | A | 3/1998 | Weingardt |
| 5,833,537 | A | 11/1998 | Barrie |
| 5,842,921 | A | 12/1998 | Mindes |
| 5,919,091 | A | 7/1999 | Bell et al. |
| 5,947,820 | A | 9/1999 | Morro et al. |
| 5,997,401 | A | 12/1999 | Crawford |
| 6,001,016 | A | 12/1999 | Walker et al. |
| 6,039,648 | A | 3/2000 | Guinn et al. |
| 6,059,289 | A | 5/2000 | Vancura |
| 6,089,977 | A | 7/2000 | Bennett |
| 6,095,920 | A | 8/2000 | Sudahiro |
| 6,110,041 | A | 8/2000 | Walker et al. |
| 6,142,872 | A | 11/2000 | Walker et al. |
| 6,146,271 | A | 11/2000 | Kadici |
| 6,146,273 | A | 11/2000 | Olsen |
| 6,165,071 | A | 12/2000 | Weiss |
| 6,231,445 | B1 | 5/2001 | Acres |
| 6,244,958 | B1 | 6/2001 | Acres |
| 6,270,412 | B1 | 8/2001 | Crawford et al. |
| 6,290,600 | B1 | 9/2001 | Glasson |
| 6,293,866 | B1 | 9/2001 | Walker et al. |
| 6,353,390 | B1 | 3/2002 | Beri et al. |
| 6,364,768 | B1 | 4/2002 | Acres et al. |
| 6,404,884 | B1 | 6/2002 | Marwell et al. |
| 6,416,406 | B1 | 7/2002 | Duhamel |
| 6,416,409 | B1 | 7/2002 | Jordan |
| 6,443,452 | B1 | 9/2002 | Brune |
| 6,491,584 | B2 | 12/2002 | Graham et al. |
| 6,500,067 | B1 | 12/2002 | Luciano |
| 6,505,095 | B1 | 1/2003 | Kolls |
| 6,508,710 | B1 | 1/2003 | Paravia et al. |
| 6,561,900 | B1 | 5/2003 | Baerlocker et al. |
| 6,592,457 | B1 | 7/2003 | Frohm et al. |
| 6,612,574 | B1 | 9/2003 | Cole et al. |
| 6,620,046 | B2 | 9/2003 | Rowe |
| 6,641,477 | B1 | 11/2003 | Dietz, II |
| 6,645,078 | B1 | 11/2003 | Mattice |
| 6,675,152 | B1 | 1/2004 | Prasad |
| 6,699,128 | B1 | 3/2004 | Beadell |
| 6,719,630 | B1 | 4/2004 | Seelig et al. |
| 6,749,510 | B2 | 6/2004 | Globbi |
| 6,758,757 | B2 | 7/2004 | Luciano, Jr. et al. |
| 6,773,345 | B2 | 8/2004 | Walker et al. |
| 6,778,820 | B2 | 8/2004 | Tendler |
| 6,780,111 | B2 | 8/2004 | Cannon et al. |
| 6,799,032 | B2 | 9/2004 | McDonnell et al. |
| 6,800,027 | B2 | 10/2004 | Giobbi et al. |
| 6,804,763 | B1 | 10/2004 | Stockdale et al. |
| 6,811,486 | B1 | 11/2004 | Luciano, Jr. |
| 6,843,725 | B2 | 1/2005 | Nelson |
| 6,846,238 | B2 | 1/2005 | Wells |
| 6,848,995 | B1 | 2/2005 | Walker et al. |
| 6,852,029 | B2 | 2/2005 | Baltz et al. |
| 6,869,361 | B2 | 3/2005 | Sharpless et al. |
| 6,875,106 | B2 | 4/2005 | Weiss et al. |
| 6,884,170 | B2 | 4/2005 | Rowe |
| 6,884,172 | B1 | 4/2005 | Lloyd et al. |
| 6,902,484 | B2 | 6/2005 | Idaka |
| 6,908,390 | B2 | 6/2005 | Nguyen et al. |
| 6,913,532 | B2 | 7/2005 | Bearlocher et al. |
| 6,923,721 | B2 | 8/2005 | Luciano et al. |
| 6,935,958 | B2 | 8/2005 | Nelson |
| 6,949,022 | B1 | 9/2005 | Showers et al. |
| 6,955,600 | B2 | 10/2005 | Glavich et al. |
| 6,971,956 | B2 | 12/2005 | Rowe et al. |
| 6,984,174 | B2 | 1/2006 | Cannon et al. |
| 6,997,803 | B2 | 2/2006 | LeMay et al. |
| 7,018,292 | B2 | 3/2006 | Tracy et al. |
| 7,032,115 | B2 | 4/2006 | Kashani |
| 7,033,276 | B2 | 4/2006 | Walker et al. |
| 7,035,626 | B1 | 4/2006 | Luciano |
| 7,037,195 | B2 | 5/2006 | Schneider et al. |
| 7,048,628 | B2 | 5/2006 | Schneider |
| 7,048,630 | B2 | 5/2006 | Berg et al. |
| 7,063,617 | B2 | 6/2006 | Brosnan et al. |
| 7,076,329 | B1 | 7/2006 | Kolls |
| 7,089,264 | B1 | 8/2006 | Guido et al. |
| 7,094,148 | B2 | 8/2006 | Bearlocher et al. |
| 7,105,736 | B2 | 9/2006 | Laakso |
| 7,111,141 | B2 | 9/2006 | Nelson |
| 7,144,321 | B2 | 12/2006 | Mayeroff |
| 7,152,783 | B2 | 12/2006 | Charrin |
| 7,169,041 | B2 | 1/2007 | Tessmer et al. |
| 7,169,052 | B2 | 1/2007 | Beaulieu et al. |
| 7,175,523 | B2 | 2/2007 | Gilmore et al. |
| 7,181,228 | B2 | 2/2007 | Boesch |
| 7,182,690 | B2 | 2/2007 | Giobbi et al. |
| 7,198,571 | B2 | 4/2007 | LeMay |
| RE39,644 | E | 5/2007 | Alcorn et al. |
| 7,217,191 | B2 | 5/2007 | Allen et al. |
| 7,243,104 | B2 | 7/2007 | Bill |
| 7,247,098 | B1 | 7/2007 | Bradford et al. |
| 7,259,718 | B2 | 8/2007 | Patterson et al. |
| 7,275,989 | B2 | 10/2007 | Moody |
| 7,285,047 | B2 | 10/2007 | Gielb et al. |
| 7,311,608 | B1 | 12/2007 | Danieli |
| 7,314,408 | B2 | 1/2008 | Cannon et al. |
| 7,316,615 | B2 | 1/2008 | Soltys et al. |
| 7,316,619 | B2 | 1/2008 | Nelson |
| 7,318,775 | B2 | 1/2008 | Brosnan et al. |
| 7,326,116 | B2 | 2/2008 | O'Donovan et al. |
| 7,330,108 | B2 | 2/2008 | Thomas |
| 7,346,358 | B2 | 3/2008 | Wood et al. |
| 7,355,112 | B2 | 4/2008 | Laakso |
| 7,384,338 | B2 | 6/2008 | Rothschild et al. |
| 7,387,571 | B2 | 6/2008 | Walker et al. |
| 7,393,278 | B2 | 7/2008 | Gerson et al. |
| 7,396,990 | B2 | 7/2008 | Lu et al. |
| 7,415,426 | B2 | 8/2008 | Williams et al. |
| 7,425,177 | B2 | 9/2008 | Rodgers et al. |
| 7,427,234 | B2 | 9/2008 | Soltys et al. |
| 7,427,236 | B2 | 9/2008 | Kaminkow et al. |
| 7,427,708 | B2 | 9/2008 | Ohmura |
| 7,431,650 | B2 | 10/2008 | Kessman |
| 7,448,949 | B2 | 11/2008 | Kaminkow et al. |
| 7,500,913 | B2 | 3/2009 | Baerlocher |
| 7,510,474 | B2 | 3/2009 | Carter |
| 7,513,828 | B2 | 4/2009 | Nguyen et al. |
| 7,519,838 | B1 | 4/2009 | Suurballe |
| 7,559,838 | B2 | 7/2009 | Walker et al. |
| 7,563,167 | B2 | 7/2009 | Walker et al. |
| 7,572,183 | B2 | 8/2009 | Olivas et al. |
| 7,585,222 | B2 | 9/2009 | Muir |
| 7,602,298 | B2 | 10/2009 | Thomas |
| 7,607,174 | B1 | 10/2009 | Kashchenko et al. |
| 7,611,409 | B2 | 11/2009 | Muir et al. |
| 7,637,810 | B2 | 12/2009 | Amaitis et al. |
| 7,644,861 | B2 | 1/2010 | Alderucci et al. |
| 7,653,757 | B1 | 1/2010 | Fernald et al. |
| 7,693,306 | B2 | 4/2010 | Huber |
| 7,699,703 | B2 | 4/2010 | Muir |
| 7,722,453 | B2 | 5/2010 | Lark et al. |

(56) References Cited

U.S. PATENT DOCUMENTS 7,742,996 B1 6/2010 Kwan
7,758,423 B2 7/2010 Foster et al.
7,771,271 B2 8/2010 Walker et al.
7,780,529 B2 8/2010 Rowe et al.
7,780,531 B2 8/2010 Englman et al.
7,785,192 B2 8/2010 Canterbury et al.
7,811,172 B2 10/2010 Asher et al.
7,819,749 B1 10/2010 Fish
7,822,688 B2 10/2010 Labron
7,828,652 B2 11/2010 Nguyen et al.
7,828,654 B2 11/2010 Carter
7,828,661 B1 11/2010 Fish
7,850,528 B2 12/2010 Wells
7,874,919 B2 1/2011 Paulsen et al.
7,877,798 B2 1/2011 Saunders et al.
7,883,413 B2 2/2011 Paulsen
7,892,097 B2 2/2011 Muir et al.
7,909,692 B2 3/2011 Nguyen et al.
7,909,699 B2 3/2011 Parrott et al.
7,918,728 B2 4/2011 Nguyen et al.
7,927,211 B2 4/2011 Rowe et al.
7,927,212 B2 4/2011 Hedrick et al.
7,951,008 B2 5/2011 Wolf et al.
8,057,298 B2 11/2011 Nguyen et al.
8,057,303 B2 11/2011 Rasmussen
8,087,988 B2 1/2012 Nguyen et al.
8,117,608 B1 2/2012 Slettehaugh et al.
8,133,113 B2 3/2012 Nguyen
8,182,326 B2 5/2012 Speers et al.
8,210,927 B2 7/2012 Hedrick
8,221,245 B2 7/2012 Walker
8,226,459 B2 7/2012 Barrett
8,226,474 B2 7/2012 Nguyen et al.
8,231,456 B2 7/2012 Zielinski
8,235,803 B2 8/2012 Loose et al.
8,276,010 B2 9/2012 Vavilala
8,282,475 B2 10/2012 Nguyen et al.
8,323,099 B2 12/2012 Durham et al.
8,337,290 B2 12/2012 Nguyen et al.
8,342,946 B2 1/2013 Amaitis
8,393,948 B2 3/2013 Allen et al.
8,403,758 B2 3/2013 Hornik et al.
8,430,745 B2 4/2013 Agarwal et al.
8,461,958 B2 6/2013 Saenz
8,465,368 B2 6/2013 Hardy et al.
8,469,813 B2 6/2013 Joshi
8,529,345 B2 9/2013 Nguyen
8,597,108 B2 12/2013 Nguyen
8,602,875 B2 12/2013 Nguyen
8,613,655 B2 12/2013 Kisenwether et al.
8,613,659 B2 12/2013 Nelson et al.
8,622,823 B2 1/2014 Huynh
8,678,901 B1 3/2014 Kelly
8,696,470 B2 4/2014 Nguyen
8,745,417 B2 6/2014 Huang et al.
8,821,255 B1 9/2014 Friedman
8,834,254 B2 9/2014 Buchholz et al.
8,858,323 B2 10/2014 Nguyen et al.
8,864,586 B2 10/2014 Nguyen
8,942,995 B1 1/2015 Kerr
9,039,507 B2 5/2015 Allen et al.
9,235,952 B2 1/2016 Nguyen
9,292,996 B2 3/2016 Davis et al.
9,325,203 B2 4/2016 Nguyen
9,466,171 B2 10/2016 Hornik
9,483,901 B2 11/2016 Nguyen
9,486,697 B2 11/2016 Nguyen
9,486,704 B2 11/2016 Nguyen
9,530,277 B2 12/2016 Nelson et al.
9,576,425 B2 2/2017 Nguyen
9,626,826 B2 4/2017 Nguyen
9,666,015 B2 5/2017 Acres
9,666,021 B2 5/2017 Nguyen
9,672,686 B2 6/2017 Nguyen
9,741,205 B2 8/2017 Nguyen
9,811,973 B2 11/2017 Nguyen
9,814,970 B2 11/2017 Nguyen
9,842,462 B2 12/2017 Nguyen
9,875,606 B2 1/2018 Nguyen
9,875,609 B2 1/2018 Nguyen
9,981,180 B2 5/2018 Koyanagi et al.
10,068,429 B2 9/2018 Gagner et al.
10,115,270 B2 10/2018 Gagner et al.
10,140,816 B2 11/2018 Nguyen
10,325,447 B2 6/2019 Malek
10,421,010 B2 9/2019 Nguyen
10,438,446 B2 10/2019 Nguyen
10,445,978 B2 10/2019 Nguyen
10,796,679 B1 7/2020 Cohen et al.
10,818,133 B2 10/2020 Nguyen
2001/0004607 A1 6/2001 Olsen
2001/0016516 A1 8/2001 Takatsuka
2001/0024971 A1 9/2001 Brossard
2001/0025272 A1 9/2001 Mori
2001/0031659 A1 10/2001 Perrie
2001/0047291 A1 11/2001 Garahi
2002/0006822 A1 1/2002 Krintzman
2002/0042295 A1 4/2002 Walker et al.
2002/0043759 A1 4/2002 Vancura
2002/0045474 A1 4/2002 Singer
2002/0107065 A1 8/2002 Rowe
2002/0107799 A1 8/2002 Hoshino
2002/0111210 A1 8/2002 Luciano, Jr. et al.
2002/0111213 A1 8/2002 McEntee et al.
2002/0113369 A1 8/2002 Weingardt
2002/0116615 A1 8/2002 Nguyen et al.
2002/0133418 A1 9/2002 Hammond et al.
2002/0137217 A1 9/2002 Rowe et al.
2002/0142825 A1 10/2002 Lark et al.
2002/0145051 A1 10/2002 Charrin
2002/0147047 A1 10/2002 Letovsky et al.
2002/0147049 A1 10/2002 Carter, Sr.
2002/0151366 A1 10/2002 Walker et al.
2002/0152120 A1 10/2002 Howington
2002/0167536 A1 11/2002 Valdes et al.
2002/0177483 A1 11/2002 Cannon
2002/0183105 A1 12/2002 Cannon et al.
2003/0001338 A1 1/2003 Bennett et al.
2003/0003996 A1 1/2003 Nguyen
2003/0004871 A1 1/2003 Rowe et al.
2003/0008696 A1 1/2003 Abecassis et al.
2003/0013531 A1 1/2003 Rowe
2003/0027635 A1 2/2003 Walker et al.
2003/0064805 A1 4/2003 Wells
2003/0064807 A1 4/2003 Walker et al.
2003/0078094 A1 4/2003 Gatto
2003/0092480 A1 5/2003 White et al.
2003/0100361 A1 5/2003 Sharpless et al.
2003/0104860 A1 6/2003 Cannon et al.
2003/0104865 A1 6/2003 Itkis et al.
2003/0148809 A1 8/2003 Nelson
2003/0148812 A1 8/2003 Paulsen
2003/0162588 A1 8/2003 Brosnan et al.
2003/0195024 A1 10/2003 Slattery
2003/0199295 A1 10/2003 Vancura
2003/0224852 A1 12/2003 Walker et al.
2003/0224854 A1 12/2003 Joao
2004/0002386 A1 1/2004 Wolfe et al.
2004/0005919 A1 1/2004 Walker et al.
2004/0015619 A1 1/2004 Brown
2004/0023709 A1 2/2004 Beaulieu et al.
2004/0023716 A1 2/2004 Gauselmann
2004/0038736 A1 2/2004 Bryant
2004/0048650 A1 3/2004 Mierau et al.
2004/0068460 A1 4/2004 Feeley
2004/0082384 A1 4/2004 Walker
2004/0082385 A1 4/2004 Silva et al.
2004/0094624 A1 5/2004 Fernandes
2004/0106449 A1 6/2004 Walker et al.
2004/0116115 A1 6/2004 Ertel
2004/0127277 A1 7/2004 Walker
2004/0127290 A1 7/2004 Walker et al.
2004/0137987 A1 7/2004 Nguyen et al.
2004/0142744 A1 7/2004 Atkinson

(56) References Cited

U.S. PATENT DOCUMENTS

2004/0147308 A1 7/2004 Walker et al.
2004/0152508 A1 8/2004 Lind
2004/0199631 A1 10/2004 Natsume
2004/0214622 A1 10/2004 Atkinson
2004/0224753 A1 11/2004 Odonovan et al.
2004/0229671 A1 11/2004 Stronach
2004/0256803 A1 12/2004 Ko
2004/0259633 A1 12/2004 Gentles et al.
2005/0003890 A1 1/2005 Hedrick et al.
2005/0004980 A1 1/2005 Vadjinia
2005/0026696 A1 2/2005 Hashimoto et al.
2005/0033651 A1 2/2005 Kogan
2005/0043996 A1 2/2005 Silver
2005/0054446 A1 3/2005 Kammler
2005/0101376 A1 5/2005 Walker et al.
2005/0101383 A1 5/2005 Wells
2005/0125244 A1 6/2005 Schneider
2005/0130728 A1 6/2005 Nguyen et al.
2005/0130731 A1 6/2005 Englman
2005/0136949 A1 6/2005 Barnes
2005/0137014 A1 6/2005 Vetelaninen
2005/0143169 A1 6/2005 Nguyen
2005/0167921 A1 8/2005 Finocchio
2005/0170883 A1 8/2005 Muskin et al.
2005/0181865 A1 8/2005 Luciano
2005/0181870 A1 8/2005 Nguyen et al.
2005/0181875 A1 8/2005 Hoehne
2005/0187020 A1 8/2005 Amaitis et al.
2005/0202865 A1 9/2005 Kim
2005/0202875 A1 9/2005 Murphy et al.
2005/0208993 A1 9/2005 Yoshizawa
2005/0209002 A1 9/2005 Blythe et al.
2005/0221881 A1 10/2005 Lannert
2005/0223219 A1 10/2005 Gatto et al.
2005/0239546 A1 10/2005 Hedrick
2005/0255919 A1 11/2005 Nelson
2005/0273635 A1 12/2005 Wilcox et al.
2005/0277471 A1 12/2005 Russell et al.
2005/0282637 A1 12/2005 Gatto et al.
2006/0009283 A1 1/2006 Englman et al.
2006/0035707 A1 2/2006 Nguyen
2006/0036874 A1 2/2006 Cockerille
2006/0046822 A1 3/2006 Kaminkow et al.
2006/0046830 A1 3/2006 Webb
2006/0046849 A1 3/2006 Kovacs
2006/0068893 A1 3/2006 Jaffe et al.
2006/0068897 A1 3/2006 Sanford
2006/0073869 A1 4/2006 LeMay et al.
2006/0073888 A1 4/2006 Nguyen
2006/0073897 A1 4/2006 Englman et al.
2006/0079317 A1 4/2006 Flemming et al.
2006/0121972 A1 6/2006 Walker
2006/0126529 A1 6/2006 Hardy
2006/0148551 A1 7/2006 Walker et al.
2006/0189382 A1 8/2006 Muir et al.
2006/0217170 A1 9/2006 Roireau
2006/0217193 A1 9/2006 Walker et al.
2006/0247028 A1 11/2006 Brosnan et al.
2006/0247035 A1 11/2006 Rowe et al.
2006/0252530 A1 11/2006 Oberberger et al.
2006/0253481 A1 11/2006 Guido et al.
2006/0256135 A1 11/2006 Aoyama
2006/0281525 A1 12/2006 Borissov
2006/0281541 A1 12/2006 Nguyen et al.
2006/0287106 A1 12/2006 Jensen
2007/0004510 A1 1/2007 Underdahl et al.
2007/0026935 A1 2/2007 Wolf et al.
2007/0026942 A1 2/2007 Kinsley
2007/0054739 A1 3/2007 Amaitis et al.
2007/0060254 A1 3/2007 Muir
2007/0060306 A1 3/2007 Amaitis et al.
2007/0060319 A1 3/2007 Block et al.
2007/0060358 A1 3/2007 Amaitas et al.
2007/0077981 A1 4/2007 Hungate et al.
2007/0087833 A1 4/2007 Feeney et al.
2007/0087834 A1 4/2007 Moser et al.
2007/0093299 A1 4/2007 Bergeron
2007/0129123 A1 6/2007 Eryou et al.
2007/0129148 A1 6/2007 Van Luchene
2007/0149279 A1 6/2007 Norden et al.
2007/0149286 A1 6/2007 Bemmel
2007/0155465 A1 7/2007 Walker
2007/0159301 A1 7/2007 Hirt et al.
2007/0161402 A1 7/2007 Ng et al.
2007/0184896 A1 8/2007 Dickerson
2007/0184904 A1 8/2007 Lee
2007/0191109 A1 8/2007 Crowder et al.
2007/0207852 A1 9/2007 Nelson et al.
2007/0207854 A1 9/2007 Wolf et al.
2007/0235521 A1 10/2007 Mateen
2007/0238505 A1 10/2007 Okada
2007/0241187 A1 10/2007 Alderucci et al.
2007/0248036 A1 10/2007 Nevalainen
2007/0257430 A1 11/2007 Hardy et al.
2007/0259713 A1 11/2007 Fiden et al.
2007/0259716 A1 11/2007 Mattice
2007/0259717 A1 11/2007 Mattice et al.
2007/0265984 A1 11/2007 Santhana
2007/0270213 A1 11/2007 Nguyen et al.
2007/0275777 A1 11/2007 Walker et al.
2007/0275779 A1 11/2007 Amaitis et al.
2007/0281782 A1 12/2007 Amaitis et al.
2007/0281785 A1 12/2007 Amaitas et al.
2007/0298858 A1 12/2007 Toneguzzo
2007/0298873 A1 12/2007 Nguyen et al.
2008/0015032 A1 1/2008 Bradford et al.
2008/0020824 A1 1/2008 Cuddy et al.
2008/0020845 A1 1/2008 Low
2008/0032787 A1 2/2008 Low et al.
2008/0058105 A1 3/2008 Combs
2008/0070652 A1 3/2008 Nguyen et al.
2008/0070681 A1 3/2008 Marks et al.
2008/0076505 A1 3/2008 Nguyen
2008/0076506 A1 3/2008 Nguyen et al.
2008/0076548 A1 3/2008 Paulsen
2008/0076572 A1 3/2008 Nguyen et al.
2008/0096650 A1 4/2008 Baerlocher
2008/0102916 A1 5/2008 Kovacs
2008/0102935 A1 5/2008 Finnimore
2008/0102956 A1 5/2008 Burman et al.
2008/0102957 A1 5/2008 Burnman et al.
2008/0108401 A1 5/2008 Baerlocker et al.
2008/0113772 A1 5/2008 Burrill et al.
2008/0119267 A1 5/2008 Denlay
2008/0126529 A1 5/2008 Kim
2008/0139274 A1 6/2008 Baerlocher
2008/0139306 A1 6/2008 Lutnick
2008/0146321 A1 6/2008 Parente
2008/0146344 A1 6/2008 Rowe et al.
2008/0150902 A1 6/2008 Edpalm et al.
2008/0153583 A1 6/2008 Huntley et al.
2008/0161110 A1 7/2008 Campbell
2008/0167106 A1 7/2008 Lutnick et al.
2008/0167118 A1 7/2008 Kroeckel
2008/0182667 A1 7/2008 Davis et al.
2008/0200251 A1 8/2008 Alderucci
2008/0207307 A1 8/2008 Cunningham, II et al.
2008/0167130 A1 9/2008 Koreckel
2008/0214258 A1 9/2008 Brosnan et al.
2008/0214310 A1 9/2008 Brunet de Courssou
2008/0215319 A1 9/2008 Lu
2008/0234047 A1 9/2008 Nguyen
2008/0238610 A1 10/2008 Rosenbereg
2008/0248849 A1 10/2008 Lutnick
2008/0248865 A1 10/2008 Cole
2008/0252419 A1 10/2008 Batchelor
2008/0254878 A1 10/2008 Sauders et al.
2008/0254881 A1 10/2008 Lutnick et al.
2008/0254883 A1 10/2008 Patel et al.
2008/0254891 A1 10/2008 Sauders et al.
2008/0254892 A1 10/2008 Sauders et al.
2008/0254897 A1 10/2008 Sauders et al.
2008/0263173 A1 10/2008 Weber et al.
2008/0300058 A1 12/2008 Sum et al.

(56) References Cited

U.S. PATENT DOCUMENTS

2008/0305864 A1 12/2008 Kelly et al.
2008/0305865 A1 12/2008 Kelly et al.
2008/0305866 A1 12/2008 Kelly et al.
2008/0311994 A1 12/2008 Amaitas et al.
2008/0318669 A1 12/2008 Buchholz
2008/0318686 A1 12/2008 Crowder et al.
2009/0005165 A1 1/2009 Arezina et al.
2009/0011822 A1 1/2009 Englman
2009/0017906 A1 1/2009 Jackson
2009/0021381 A1 1/2009 Higuchi
2009/0029766 A1 1/2009 Lutnick et al.
2009/0054149 A1 2/2009 Brosnan et al.
2009/0061990 A1 3/2009 Schwartz
2009/0069063 A1 3/2009 Thomas
2009/0077396 A1 3/2009 Tsai et al.
2009/0088258 A1 4/2009 Saunders et al.
2009/0098925 A1 4/2009 Gagner et al.
2009/0104977 A1 4/2009 Zielinski
2009/0104983 A1 4/2009 Okada
2009/0118002 A1 5/2009 Lyons
2009/0118013 A1 5/2009 Finnimore et al.
2009/0118022 A1 5/2009 Lyons et al.
2009/0124366 A1 5/2009 Aoki et al.
2009/0124390 A1 5/2009 Seelig et al.
2009/0131146 A1 5/2009 Arezina et al.
2009/0131151 A1 5/2009 Harris et al.
2009/0131155 A1 5/2009 Hollibaugh
2009/0132163 A1 5/2009 Ashley et al.
2009/0137255 A1 5/2009 Ashley et al.
2009/0138133 A1 5/2009 Buchholz et al.
2009/0143141 A1 6/2009 Wells
2009/0149245 A1 6/2009 Fabbri
2009/0149261 A1 6/2009 Chen et al.
2009/0153342 A1 6/2009 Thorn
2009/0156303 A1 6/2009 Kiely et al.
2009/0163272 A1 6/2009 Baker
2009/0176578 A1 7/2009 Herrmann et al.
2009/0191962 A1 7/2009 Hardy et al.
2009/0197684 A1 8/2009 Arezina et al.
2009/0216547 A1 8/2009 Canora et al.
2009/0219901 A1 9/2009 Bull et al.
2009/0221342 A1 9/2009 Katz et al.
2009/0227302 A1 9/2009 Abe
2009/0239666 A1 9/2009 Hall et al.
2009/0264190 A1 10/2009 Davis et al.
2009/0265105 A1 10/2009 Davis
2009/0270166 A1 10/2009 Thukral
2009/0270170 A1 10/2009 Patton
2009/0271287 A1 10/2009 Halpern
2009/0275402 A1 11/2009 Backover
2009/0275410 A1 11/2009 Kisenwether et al.
2009/0275411 A1 11/2009 Kisenwether et al.
2009/0280910 A1 11/2009 Gagner et al.
2009/0282469 A1 11/2009 Lynch
2009/0298468 A1 12/2009 Hsu
2010/0002897 A1 1/2010 Keady
2010/0004058 A1 1/2010 Acres
2010/0016069 A1 1/2010 Herrmann
2010/0049738 A1 2/2010 Mathur et al.
2010/0056248 A1 3/2010 Acres
2010/0062833 A1 3/2010 Mattice et al.
2010/0062840 A1 3/2010 Herrmann et al.
2010/0069160 A1 3/2010 Barrett
2010/0079237 A1 4/2010 Falk
2010/0081501 A1 4/2010 Carpenter et al.
2010/0081509 A1* 4/2010 Burke ................. G07F 17/3227
463/25
2010/0099499 A1 4/2010 Amaitis et al.
2010/0105454 A1 4/2010 Weber et al.
2010/0106612 A1 4/2010 Gupta
2010/0113161 A1 5/2010 Walker
2010/0115591 A1 5/2010 Kane-Esrig
2010/0120486 A1 5/2010 DeWaal
2010/0124967 A1 5/2010 Lutnick et al.
2010/0130276 A1 5/2010 Fiden
2010/0160035 A1 6/2010 Herrmann
2010/0160043 A1 6/2010 Fujimoto et al.
2010/0178977 A1 7/2010 Kim et al.
2010/0184509 A1 7/2010 Sylla
2010/0197383 A1 8/2010 Rader et al.
2010/0197385 A1 8/2010 Aoki et al.
2010/0203955 A1 8/2010 Sylla
2010/0203957 A1 8/2010 Enzminger
2010/0203963 A1 8/2010 Allen
2010/0224681 A1 9/2010 Triplett
2010/0227662 A1 9/2010 Speers et al.
2010/0227670 A1 9/2010 Arezine et al.
2010/0227671 A1 9/2010 Laaroussi
2010/0227687 A1 9/2010 Speers et al.
2010/0234091 A1 9/2010 Baerlocher et al.
2010/0279764 A1 11/2010 Allen et al.
2010/0323780 A1 12/2010 Acres
2010/0325703 A1 12/2010 Etchegoyen
2011/0009181 A1 1/2011 Speers et al.
2011/0039615 A1 2/2011 Acres
2011/0053679 A1 3/2011 Canterbury et al.
2011/0065492 A1 3/2011 Acres
2011/0076941 A1 3/2011 Taveau
2011/0086696 A1 4/2011 MacEwan
2011/0105216 A1 5/2011 Cohen
2011/0111827 A1 5/2011 Nicely et al.
2011/0111843 A1 5/2011 Nicely et al.
2011/0111860 A1 5/2011 Nguyen
2011/0118010 A1 5/2011 Brune
2011/0159966 A1 6/2011 Gura et al.
2011/0183732 A1 7/2011 Block
2011/0183749 A1 7/2011 Allen
2011/0207525 A1 8/2011 Allen
2011/0212711 A1 9/2011 Scott
2011/0212767 A1 9/2011 Barclay et al.
2011/0223993 A1 9/2011 Allen et al.
2011/0244952 A1 10/2011 Schueller
2011/0263318 A1 10/2011 Agarwal et al.
2011/0269548 A1 11/2011 Barclay et al.
2011/0306400 A1 12/2011 Nguyen
2011/0306426 A1 12/2011 Novak et al.
2012/0015709 A1 1/2012 Bennett et al.
2012/0028703 A1 2/2012 Anderson et al.
2012/0028718 A1 2/2012 Barclay et al.
2012/0034968 A1 2/2012 Watkins et al.
2012/0046110 A1 2/2012 Amaitis
2012/0094769 A1 4/2012 Nguyen et al.
2012/0100908 A1 4/2012 Wells
2012/0108319 A1 5/2012 Caputo et al.
2012/0122561 A1 5/2012 Hedrick
2012/0122567 A1 5/2012 Gangadharan et al.
2012/0122584 A1 5/2012 Nguyen
2012/0122590 A1 5/2012 Nguyen
2012/0172130 A1 7/2012 Acres
2012/0184362 A1 7/2012 Barclay et al.
2012/0184363 A1 7/2012 Barclay et al.
2012/0185398 A1 7/2012 Weis
2012/0190426 A1 7/2012 Acres
2012/0194448 A1 8/2012 Rothkopf
2012/0208618 A1 8/2012 Frerking
2012/0231885 A1 9/2012 Speer, II
2012/0239566 A1 9/2012 Everett
2012/0322563 A1 12/2012 Nguyen et al.
2012/0330740 A1 12/2012 Pennington et al.
2013/0005433 A1 1/2013 Holch
2013/0005443 A1 1/2013 Kosta
2013/0005453 A1 1/2013 Nguyen et al.
2013/0059650 A1 3/2013 Sylla et al.
2013/0065668 A1 3/2013 LeMay
2013/0281188 A1 3/2013 Guinn
2013/0103965 A1 4/2013 Golembeski
2013/0104193 A1 4/2013 Gatto et al.
2013/0130766 A1 5/2013 Harris et al.
2013/0132745 A1 5/2013 Schoening et al.
2013/0165210 A1 6/2013 Nelson
2013/0185559 A1 7/2013 Morel
2013/0196756 A1 8/2013 Nguyen
2013/0196776 A1 8/2013 Nguyen
2013/0210513 A1 8/2013 Nguyen

(56) References Cited

U.S. PATENT DOCUMENTS

| | | | |
|---|---|---|---|
| 2013/0210514 | A1 | 8/2013 | Nguyen |
| 2013/0210530 | A1 | 8/2013 | Nguyen |
| 2013/0225279 | A1 | 8/2013 | Patceg |
| 2013/0225282 | A1 | 8/2013 | Williams et al. |
| 2013/0231192 | A1 | 9/2013 | Walker |
| 2013/0252730 | A1 | 9/2013 | Joshi |
| 2013/0281187 | A1 | 10/2013 | Skelton |
| 2013/0316808 | A1 | 11/2013 | Nelson |
| 2013/0337878 | A1 | 12/2013 | Shepherd |
| 2013/0337889 | A1 | 12/2013 | Gagner |
| 2014/0006129 | A1 | 1/2014 | Heath |
| 2014/0057716 | A1 | 2/2014 | Massing et al. |
| 2014/0087862 | A1 | 3/2014 | Burke |
| 2014/0094295 | A1 | 4/2014 | Nguyen |
| 2014/0094316 | A1 | 4/2014 | Nguyen |
| 2014/0121005 | A1 | 5/2014 | Nelson |
| 2014/0179431 | A1 | 6/2014 | Nguyen |
| 2014/0235332 | A1 | 8/2014 | Block |
| 2014/0274306 | A1 | 9/2014 | Crawford |
| 2014/0274309 | A1 | 9/2014 | Nguyen |
| 2014/0274319 | A1 | 9/2014 | Nguyen |
| 2014/0274320 | A1 | 9/2014 | Nguyen |
| 2014/0274342 | A1 | 9/2014 | Nguyen |
| 2014/0274357 | A1 | 9/2014 | Nguyen |
| 2014/0274360 | A1 | 9/2014 | Nguyen |
| 2014/0274367 | A1 | 9/2014 | Nguyen |
| 2014/0274388 | A1 | 9/2014 | Nguyen |
| 2015/0089595 | A1 | 3/2015 | Telles |
| 2015/0133223 | A1 | 5/2015 | Carter |
| 2015/0143543 | A1 | 8/2015 | Phegade |
| 2016/0125695 | A1 | 5/2016 | Nguyen |
| 2017/0116819 | A1 | 4/2017 | Nguyen |
| 2017/0116823 | A1 | 4/2017 | Nguyen |
| 2017/0144071 | A1 | 5/2017 | Nguyen |
| 2017/0148259 | A1 | 5/2017 | Nguyen |
| 2017/0148261 | A1 | 5/2017 | Nguyen |
| 2017/0148263 | A1 | 5/2017 | Nguyen |
| 2017/0154497 | A1 | 6/2017 | Nguyen |
| 2017/0206734 | A1 | 7/2017 | Nguyen |
| 2017/0228979 | A1 | 8/2017 | Nguyen |
| 2017/0243440 | A1 | 8/2017 | Nguyen |
| 2017/0337770 | A1 | 11/2017 | Nguyen |
| 2018/0144581 | A1 | 5/2018 | Nguyen |
| 2019/0005773 | A1 | 1/2019 | Nguyen |
| 2019/0122490 | A1 | 4/2019 | Nguyen |
| 2019/0122492 | A1 | 4/2019 | Nguyen |
| 2019/0213829 | A1 | 7/2019 | Nguyen |
| 2020/0372753 | A1 | 11/2020 | Nguyen |

FOREIGN PATENT DOCUMENTS

| | | |
|---|---|---|
| GB | 2096376 | 10/1982 |
| GB | 2097570 | 11/1982 |
| GB | 2335524 | 9/1999 |
| PH | 12005000454 | 5/2007 |
| WO | WO 05073933 | 8/2005 |
| WO | WO 2008/027621 | 3/2008 |
| WO | WO 2009/026309 | 2/2009 |
| WO | WO 2009/062148 | 5/2009 |
| WO | WO 2010/017252 A1 | 2/2010 |

OTHER PUBLICATIONS

Benston, Liz, “Harrahs Launches iPhone App; Caesars Bypasses Check-in,” Las Vegas Sun, Las Vegas, NV. Jan. 8, 2010.
Finnegan, Amanda, “Casinos Connecting with Customers via iphone Apps”, May 27, 2010, Las Vegas Sun, Las Vegas, NV.
Gaming Today Staff, “Slots showcased at 2009 National Indian Gaming Assoc.”, GamingToday.com, Apr. 14, 2009.
Green, Marian, “Testing Texting Casino Journal”, Mar. 2, 2009.
Hasan, Ragib, et al., “A Survey of Peer-to-Peer Storage Techniques for Distributed File Systems”, National Center for Supercomputing Applications, Department of Computer Science, University of Illinois at Urbana Champaign, Jun. 27, 2005.
Jones, Trahern, “Telecon-equipped drones could revolutionize wireless market”, azcentral.com, http://www.azcentral.com/business/news/articles/20130424telecom-equipped-drones-could-revolutionize-wireless-market.html, downloaded Jul. 2, 2013, 2 pages.
Yancey, Kitty Bean, “Navigate Around Vegas with New iPhone Apps”, USA Today, Jun. 3, 2010.
IAPS, Daily Systems LLC, 2010.
U.S. Appl. No. 12/945,888, filed Nov. 14, 2010.
U.S. Appl. No. 12/945,889, filed Nov. 14, 2010.
U.S. Appl. No. 13/622,702, filed Sep. 19, 2012.
U.S. Appl. No. 13/800,917, filed Mar. 13, 2013.
U.S. Appl. No. 13/296,182, filed Nov. 15, 2011.
U.S. Appl. No. 13/801,234, filed Mar. 13, 2013.
U.S. Appl. No. 13/801,171, filed Mar. 13, 2013.
U.S. Appl. No. 13/843,192, filed Mar. 15, 2013.
U.S. Appl. No. 13/843,087, filed Mar. 15, 2013.
U.S. Appl. No. 13/632,743, filed Oct. 1, 2012.
U.S. Appl. No. 13/632,828, filed Oct. 1, 2012.
U.S. Appl. No. 13/833,953, filed Mar. 15, 2013.
U.S. Appl. No. 12/619,672, filed Nov. 16, 2009.
U.S. Appl. No. 13/801,121, filed Mar. 13, 2013.
U.S. Appl. No. 12/581,115, filed Oct. 17, 2009.
U.S. Appl. No. 13/801,076, filed Mar. 13, 2013.
U.S. Appl. No. 13/617,717, filed Nov. 12, 2009.
U.S. Appl. No. 13/633,118, filed Oct. 1, 2012.
U.S. Appl. No. 12/797,610, filed Jun. 10, 2010.
U.S. Appl. No. 13/801,256, filed Mar. 13, 2013.
U.S. Appl. No. 12/757,968, filed Apr. 9, 2010.
U.S. Appl. No. 12/797,616, filed Jun. 10, 2010.
U.S. Appl. No. 13/557,063, filed Jul. 24, 2012.
U.S. Appl. No. 13/833,116, filed Mar. 15, 2013.
U.S. Appl. No. 13/801,271, filed Mar. 13, 2011.
Office Action for U.S. Appl. No. 12/945,888 dated Apr. 10, 2012.
Final Office Action for U.S. Appl. No. 12/945,888 dated Sep. 21, 2012.
Advisory Action for U.S. Appl. No. 12/945,888 dated Jan. 30, 2013.
Office Action for U.S. Appl. No. 12/581,115 dated Dec. 20, 2011.
Final Office Action for U.S. Appl. No. 12/581,115 dated Sep. 13, 2012.
Notice of Allowance for U.S. Appl. No. 12/581,115 dated May 24, 2013.
Office Action for U.S. Appl. No. 12/619,672 dated Dec. 20, 2011.
Final Office Action for U.S. Appl. No. 12/619,672 dated Nov. 6, 2012.
Office Action for U.S. Appl. No. 12/619,672 dated Mar. 7, 2013.
Office Action for U.S. Appl. No. 12/617,717 dated Oct. 4, 2011.
Office Action for U.S. Appl. No. 12/617,717 dated Apr. 4, 2012.
Advisory Action for U.S. Appl. No. 12/617,717 dated Jun. 12, 2011.
Office Action for U.S. Appl. No. 12/617,717 dated Jun. 17, 2013.
Office Action for U.S. Appl. No. 12/797,610 dated Dec. 8, 2011.
Final Office Action for U.S. Appl. No. 12/797,610 dated Jun. 6, 2012.
Office Action for U.S. Appl. No. 12/797,610 dated Feb. 26, 2013.
Office Action for U.S. Appl. No. 12/757,968, dated May 9, 2012.
Final Office Action for U.S. Appl. No. 12/757,968, dated Nov. 29, 2012.
Office Action for U.S. Appl. No. 12/757,968, dated Apr. 25, 2013.
Office Action for U.S. Appl. No. 12/797,616 dated Mar. 15, 2012.
Final Office Action for U.S. Appl. No. 12/797,616 dated Oct. 13, 2012.
Office Action for U.S. Appl. No. 12/797,616 dated Feb. 13, 2013.
Final Office Action for U.S. Appl. No. 12/797,616 dated May 8, 2013.
Office Action for U.S. Appl. No. 13/296,182 dated Dec. 5, 2012.
Brochure, 5000 Ft. Inc., 1 page, Nov. 2010.
Frontier Fortune game, email notification, MGM Resorts Intl., Aug. 9, 2013.
“Getting Back in the Game: Geolocation Can Ensure Compliance with New iGaming Regulations”, White Paper, Quova, Inc., 2010.
Notice of Allowance of U.S. Appl. No. 12/619,672, dated Aug. 23, 2013.
Office Action for U.S. Appl. No. 13/633,118, dated Sep. 20, 2013.

(56) References Cited

OTHER PUBLICATIONS

Office Action for U.S. Appl. No. 13/801,256, dated Jul. 2, 2013.
Notice of Allowance for U.S. Appl. No. 12/619,672, dated Oct. 3, 2013.
Notice of Allowance for U.S. Appl. No. 12/757,968, dated Oct. 11, 2013.
Final Office Action for U.S. Appl. No. 12/797,610, dated Jul. 10, 2013.
Notice of Allowance for U.S. Appl. No. 12/757,968, dated Dec. 18, 2013.
Office Action for U.S. Appl. No. 12/945,889, dated Dec. 18, 2013.
Office Action for U.S. Appl. No. 13/632,828, dated Jul. 30, 2013.
Restriction Requirement for U.S. Appl. No. 13/801,256, dated Dec. 30, 2013.
Office Action for U.S. Appl. No. 13/801,171, dated Dec. 26, 2013.
Office Action for U.S. Appl. No. 13/801,234, dated Jan. 10, 2014.
Final Office Action for U.S. Appl. No. 13/296,182, dated Feb. 12, 2014.
Office Action for U.S. Appl. No. 12/617,717, dated Feb. 25, 2014.
Office Action for U.S. Appl. No. 13/801,076, dated Mar. 28, 2014.
Final Office Action for U.S. Appl. No. 13/633,118, dated Apr. 3, 2014.
Office Action for U.S. Appl. No. 13/843,192, dated Apr. 3, 2014.
Office Action for U.S. Appl. No. 13/632,743, dated Apr. 10, 2014.
Office Action for U.S. Appl. No. 13/801,121, dated Apr. 11, 2014.
Final Office Action for U.S. Appl. No. 12/945,889, dated Jun. 30, 2014.
Notice of Allowance for U.S. Appl. No. 12/617,717, dated Jul. 14, 2014.
Office Action for U.S. Appl. No. 13/801,121, dated Sep. 24, 2014.
Office Action for U.S. Appl. No. 13/801,171, dated Sep. 22, 2014.
Office Action for U.S. Appl. No. 13/801,234, dated Oct. 1, 2014.
Office Action for U.S. Appl. No. 13/801,271, dated Oct. 31, 2014.
Final Office Action for U.S. Appl. No. 13/843,192, dated Oct. 21, 2014.
Office Action for U.S. Appl. No. 13/632,743, dated Oct. 23, 2014.
Office Action for U.S. Appl. No. 12/945,889, dated Oct. 23, 2014.
Office Action for U.S. Appl. No. 13/632,828, dated Nov. 7, 2014.
Office Action for U.S. Appl. No. 12/797,610, dated Dec. 15, 2014.
Final Office Action for U.S. Appl. No. 12/945,889, dated Feb. 12, 2015.
Final Office Action for U.S. Appl. No. 13/801,171, dated Mar. 16, 2015.
Office Action for U.S. Appl. No. 13/833,116, dated Mar. 27, 2015.
Office Action for U.S. Appl. No. 13/632,828, dated Apr. 10, 2015.
Final Office Action for U.S. Appl. No. 13/801,121, dated Apr. 21, 2015.
Final Office Action for U.S. Appl. No. 13/557,063, dated Apr. 28, 2015.
Office Action for U.S. Appl. No. 13/296,182, dated Jun. 5, 2015.
Office Action for U.S. Appl. No. 13/843,192, dated Jun. 19, 2015.
Office Action for U.S. Appl. No. 12/797,610, dated Jul. 14, 2015.
Final Office Action for U.S. Appl. No. 12/945,889, dated Jul. 17, 2015.
Notice of Allowance for U.S. Appl. No. 12/945,889, dated Jul. 22, 2015.
Office Action for U.S. Appl. No. 12/797,616, dated Aug. 10, 2015.
Final Office Action for U.S. Appl. No. 13/801,234, dated Aug. 14, 2015.
Final Office Action for U.S. Appl. No. 13/833,116, dated Sep. 24, 2015.
Office Action for U.S. Appl. No. 13/801,121, dated Oct. 2, 2015.
Office Action for U.S. Appl. No. 14/017,150, dated Oct. 7, 2015.
Office Action for U.S. Appl. No. 14/017,159, dated Oct. 7, 2015.
Office Action for U.S. Appl. No. 13/801,271 dated Oct. 19, 2015.
Office Action for U.S. Appl. No. 14/211,536 dated Oct. 19, 2015.
Final Office Action for U.S. Appl. No. 13/632,828, dated Oct. 22, 2015.
Office Action for U.S. Appl. No. 13/557,063, dated Dec. 17, 2015.
Notice of Allowance for U.S. Appl. No. 13/557,063, dated Dec. 23, 2015.
Office Action for U.S. Appl. No. 13/296,182, dated Dec. 23, 2015.
Final Office Action for U.S. Appl. No. 13/843,192, dated Dec. 30, 2015.
Office Action for U.S. Appl. No. 13/801,076, dated Jan. 11, 2016.
Office Action for U.S. Appl. No. 12/945,888, dated Jan. 22, 2016.
Final Office Action for U.S. Appl. No. 12/797,616, dated Jun. 12, 2016.
Office Action for U.S. Appl. No. 13/843,087, dated Feb. 25, 2016.
Office Action for U.S. Appl. No. 13/800,917, dated Feb. 25, 2016.
Office Action for U.S. Appl. No. 13/801,234, dated Mar. 8, 2016.
Office Action for U.S. Appl. No. 14/216,986, dated Mar. 9, 2016.
Final Office Action for U.S. Appl. No. 13/801,271, dated Mar. 11, 2016.
Office Action for U.S. Appl. No. 13/622,702, dated Mar. 22, 2016.
Final Office Action for U.S. Appl. No. 13/633,118, dated Mar. 24, 2016.
Final Office Action for U.S. Appl. No. 14/189,948, dated Apr. 6, 2016.
Final Office Action for U.S. Appl. No. 12/797,610, dated Apr. 21, 2016.
Final Office Action for U.S. Appl. No. 14/017,150, dated Apr. 26, 2016.
Final Office Action for U.S. Appl. No. 13/801,121, dated May 11, 2016.
Final Office Action for U.S. Appl. No. 14/017,159, dated Jun. 6, 2016.
Office Action for U.S. Appl. No. 13/801,171, dated Jun. 6, 2016.
Office Action for U.S. Appl. No. 13/843,192, dated Jun. 9, 2016.
Final OA for U.S. Appl. No. 12/945,888, dated Jun. 28, 2016.
Notice of Allowance for U.S. Appl. No. 13/833,953, dated Jul. 6, 2016.
Final Office Action for U.S. Appl. No. 13/801,171, dated May 21, 2014.
Final Office Action for U.S. Appl. No. 13/801,234, dated May 22, 2014.
Office Action for U.S. Appl. No. 14/211,536, dated Jul. 13, 2016.
Notice of Allowance for U.S. Appl. No. 13/801,076, dated Jul. 11, 2016.
Office Action for U.S. Appl. No. 13/296,182, dated Jul. 20, 2016.
Restriction Requirement for U.S. Appl. No. 13/296,182, dated Oct. 12, 2012.
Advisory Action for U.S. Appl. No. 13/296,182, dated May 8, 2014.
Advisory Action for U.S. Appl. No. 13/843,192, dated May 8, 2014.
Notice of Allowance for U.S. Appl. No. 13/843,192, dated Aug. 10, 2016.
Office Action for U.S. Appl. No. 14/217,066, dated Dec. 22, 2016.
Final Office Action for U.S. Appl. No. 14/216,986, dated Sep. 23, 2016.
Office Action for U.S. Appl. No. 14/017,159, dated Sep. 23, 2016.
Office Action for U.S. Appl. No. 13/632,743, dated Sep. 23, 2016.
Final Office Action for U.S. Appl. No. 13/801,234, dated Oct. 14, 2016.
Final Office Action for U.S. Appl. No. 13/843,087, dated Oct. 13, 2016.
Final Office Action for U.S. Appl. No. 13/622,702, dated Oct. 13, 2016.
Office Action for U.S. Appl. No. 14/189,948, dated Nov. 7, 2016.
Final Office Action for U.S. Appl. No. 14/211,536, dated Mar. 14, 2014.
Notice of Allowance for U.S. Appl. No. 13/833,116, dated Oct. 11, 2016.
Notice of Allowance for U.S. Appl. No. 13/801,271, dated Dec. 2, 2016.
Notice of Allowance for U.S. Appl. No. 12/797,610, dated Dec. 7, 2016.
Notice of Allowance for U.S. Appl. No. 13/632,828, dated Dec. 16, 2016.
Final Office Action for U.S. Appl. No. 13/801,171, dated Dec. 19, 2016.
Notice of Allowance for U.S. Appl. No. 14/211,536, dated Dec. 28, 2016.

(56) References Cited

OTHER PUBLICATIONS

Notice of Allowance for U.S. Appl. No. 13/801,256, dated Jan. 20, 2017.
Office Action for U.S. Appl. No. 13/800,917, dated Feb. 3, 2017.
Final Office Action for U.S. Appl. No. 12/797,616, dated Feb. 10, 2017.
Office Action for U.S. Appl. No. 14/189,948, dated Feb. 28, 2017.
Final Office Action for U.S. Appl. No. 14/189,948, dated Mar. 17, 2017.
Office Action for U.S. Appl. No. 13/801,121, dated Mar. 10, 2017.
Notice of Allowance for U.S. Appl. No. 13/801,121, dated Mar. 29, 2017.
Office Action for U.S. Appl. No. 15/270,333, dated Mar. 30, 2017.
Office Action for U.S. Appl. No. 15/402,945, dated Apr. 5, 2017.
Office Action for U.S. Appl. No. 15/271,488, dated Apr. 19, 2017.
Final Office Action for U.S. Appl. No. 14/217,066, dated Apr. 21, 2017.
Office Action for U.S. Appl. No. 14/216,986 dated Apr. 26, 2017.
Office Action for U.S. Appl. No. 13/801,171, dated Jun. 14, 2017.
Office Action for U.S. Appl. No. 15/400,840, dated Mar. 10, 2017.
Office Action for U.S. Appl. No. 14/017,159, dated Jun. 29, 2017.
Notice of Allowance for U.S. Appl. No. 15/270,333, dated Jul. 5, 2017.
Final Office Action for U.S. Appl. No. 13/800,917, dated Jul. 13, 2017.
Notice of Allowance for U.S. Appl. No. 13/801,234, dated Jul. 5, 2017.
Notice of Allowance for U.S. Appl. No. 14/217,066, dated Jul. 14, 2017.
Final Office Action for U.S. Appl. No. 14/518,909, dated Jul. 19, 2017.
Final Office Action for U.S. Appl. No. 13/801,121, dated Sep. 15, 2016.
Advisory Action for U.S. Appl. No. 13/801,121, dated Jul. 17, 2015.
Advisory Action for U.S. Appl. No. 13/801,121, dated Jul. 19, 2016.
Notice of Allowance for U.S. Appl. No. 15/293,751, dated Aug. 4, 2017.
Advisory Action for U.S. Appl. No. 13/801,256, dated Jul. 28, 2017.
Final OA for U.S. Appl. No. 13/801,256, dated Aug. 15, 2014.
Final OA for U.S. Appl. No. 13/801,256, dated Feb. 18, 2015.
Advisory Action for U.S. Appl. No. 13/801,256, dated Dec. 5, 2014.
Office Action for U.S. Appl. No. 13/801,256, dated Jan. 12, 2016.
Final Office Action for U.S. Appl. No. 13/801,256, dated Aug. 16, 2016.
Office Action for U.S. Appl. No. 13/622,702, dated Aug. 31, 2017.
Office Action for U.S. Appl. No. 12/945,888, dated Sep. 1, 2017.
Office Action for U.S. Appl. No. 14/017,150, dated Sep. 7, 2017.
Notice of Allowance for U.S. Appl. No. 14/189,948, dated Sep. 13, 2017.
Office Action for U.S. Appl. No. 15/138,086, dated Oct. 19, 2017.
Notice of Allowance for U.S. Appl. No. 15/402,945 dated Nov. 21, 2017.
Final Office Action for U.S. Appl. No. 13/801,171, dated Dec. 13, 2017.
Final Office Action for U.S. Appl. No. 15/271,488, dated Dec. 21, 2017.
Office Action for U.S. Appl. No. 15/671,133, dated Dec. 22, 2017.
Final Office Action for U.S. Appl. No. 14/216,986, dated Dec. 26, 2017.
Restriction Requirement for U.S. Appl. No. 15/427,307, dated Jan. 17, 2018.
Office Action for U.S. Appl. No. 15/798,363, dated Jan. 26, 2018.
Office Action for U.S. Appl. No. 15/427,291, dated Jan. 29, 2018.
Final Office Action for U.S. Appl. No. 14/017,159, dated Feb. 1, 2018.
Final Office Action for U.S. Appl. No. 13/622,702, dated Feb. 22, 2018.
Office Action for U.S. Appl. No. 15/811,654, dated Feb. 22, 2018.
Final Office Action for U.S. Appl. No. 13/622,702, dated Feb. 27, 2018.
Final Office Action for U.S. Appl. No. 15/427,308, dated Mar. 19, 2018.
Office Action for U.S. Appl. No. 15/876,095, dated Apr. 3, 2018.
Office Action for U.S. Appl. No. 15/835,448, dated Apr. 4, 2018.
Office Action for U.S. Appl. No. 15/427,307, dated Apr. 9, 2018.
Office Action for U.S. Appl. No. 14/216,986, dated Apr. 6, 2018.
Office Action for U.S. Appl. No. 15/402,945 dated Apr. 16, 2018.
Notice of Allowance for U.S. Appl. No. 15/402,945, dated May 25, 2018.
Office Action for U.S. Appl. No. 15/495,973, dated Jun. 4, 2018.
Notice of Allowance for U.S. Appl. No. 15/427,291 dated Jun. 18, 2018.
Notice of Allowance for U.S. Appl. No. 15/271,488, dated Jun. 19, 2018.
Notice of Allowance for U.S. Appl. No. 15/480,295, dated Jun. 20, 2018.
Office Action for U.S. Appl. No. 14/963,106, dated Jun. 22, 2018.
Office Action for U.S. Appl. No. 14/993,055, dated Jun. 22, 2018.
Final Office Action for U.S. Appl. No. 15/427,307, dated Jul. 9, 2018.
Notice of Allowance for U.S. Appl. No. 13/633,118, dated Aug. 3, 2018.
Office Action for U.S. Appl. No. 15/671,133, dated Aug. 9, 2018.
Office Action for U.S. Appl. No. 15/427,308, dated Aug. 15, 2018.
Office Action for U.S. Appl. No. 15/798,363, dated Aug. 29, 2018.
Office Action for U.S. Appl. No. 15/428,922 dated Sep. 17, 2018.
Office Action for U.S. Appl. No. 15/495,975, dated Sep. 21, 2018.
Notice of Allowance for U.S. Appl. No. 15/271,488, dated Sep. 24, 2018.
Notice of Allowance for U.S. Appl. No. 15/876,095, dated Sep. 24, 2018.
Office Action for U.S. Appl. No. 13/801,171, dated Oct. 3, 2018.
Office Action for U.S. Appl. No. 13/801,171, dated Apr. 6, 2017.
Notice of Allowance for U.S. Appl. No. 13/801,171, dated Oct. 31, 2018.
Final Office Action for U.S. Appl. No. 15/835,448, dated Nov. 2, 2018.
Final Office Action for U.S. Appl. No. 15/480,295, dated Nov. 7, 2018.
Final Office Action for U.S. Appl. No. 14/963,106, dated Dec. 14, 2018.
Final Office Action for U.S. Appl. No. 14/993,055, dated Dec. 14, 2018.
Office Action for U.S. Appl. No. 16/162,358, dated Dec. 31, 2018.
Office Action for U.S. Appl. No. 13/622,702, dated Oct. 3, 2018.
Office Action for U.S. Appl. No. 15/293,751, dated Apr. 6, 2017.
Office Action for U.S. Appl. No. 14/017,159, dated Jan. 11, 2019.
Office Action for U.S. Appl. No. 15/495,973, dated Jan. 11, 2019.
Final Office Action for U.S. Appl. No. 15/495,973, dated Jan. 11, 2019.
Office Action for U.S. Appl. No. 14/216,986, dated Jan. 14, 2019.
Office Action for U.S. Appl. No. 15/427,307, dated Jan. 18, 2019.
Final Office Action for U.S. Appl. No. 15/798,363, dated Feb. 4, 2019.
Office Action for U.S. Appl. No. 16/125,614, dated Feb. 25, 2019.
Final Office Action for U.S. Appl. No. 15/495,975, dated Apr. 18, 2019.
Office Action for U.S. Appl. No. 15/671,133, dated May 1, 2019.
Notice of Allowance for U.S. Appl. No. 14/216,986, dated May 17, 2019.
Notice of Allowance for U.S. Appl. No. 14/518,909, dated May 17, 2019.
Office Action for U.S. Appl. No. 12/797,616, dated Jun. 5, 2019.
Office Action for U.S. Appl. No. 15/427,308, dated Jun. 14, 2019.
Office Action for U.S. Appl. No. 15/811,654, dated Jun. 14, 2019.
Office Action for U.S. Appl. No. 15/674,480, dated Jun. 20, 2019.
Notice of Allowance for U.S. Appl. No. 15/835,448, dated Jul. 3, 2019.
Final Office Action for U.S. Appl. No. 16/162,358, dated Jul. 11, 2019.
Office Action for U.S. Appl. No. 16/190,050, dated Sep. 19, 2019.
Office Action for U.S. Appl. No. 14/017,150, dated Oct. 9, 2019.

(56) References Cited

OTHER PUBLICATIONS

Final Office Action for U.S. Appl. No. 15/671,133, dated Oct. 18, 2019.
Office Action for U.S. Appl. No. 15/835,448 dated Oct. 12, 2019.
Notice of Allowance for U.S. Appl. No. 15/495,975, dated Oct. 23, 2019.
Notice of Allowance for U.S. Appl. No. 14/993,005, dated Nov. 27, 2019.
Final Office Action for U.S. Appl. No. 15/427,308, dated Nov. 27, 2019.
Office Action for U.S. Appl. No. 15/798,363, dated Jan. 8, 2020.
Office Action for U.S. Appl. No. 15/835,448, dated Mar. 5, 2020.
Office Action for U.S. Appl. No. 15/495,975, dated Mar. 17, 2020.
Office Action for U.S. Appl. No. 16/248,759, dated Apr. 1, 2020.
Final Office Action for U.S. Appl. No. 14/017,150, dated Apr. 17, 2020.
Notice of Allowance for U.S. Appl. No. 15/798,363, dated May 12, 2020.
Office Action for U.S. Appl. No. 16/357,316, dated May 21, 2020.
Office Action for U.S. Appl. No. 15/674,480, dated Jun. 5, 2020.
Notice of Allowance for U.S. Appl. No. 15/480,295, dated Jun. 15, 2020.
Office Action for U.S. Appl. No. 13/622,702, dated Jun. 22, 2020.
Office Action for U.S. Appl. No. 15/811,654, dated Jun. 26, 2020.
Office Action for U.S. Appl. No. 16/579,754, dated Jul. 22, 2020.
Office Action for U.S. Appl. No. 16/219,940, dated Jul. 22, 2020.
Office Action for U.S. Appl. No. 16/559,553, dated Sep. 11, 2020.
Office Action for U.S. Appl. No. 16/794,212, dated Sep. 11, 2020.
Restriction Requirement for U.S. Appl. No. 16/600,395, dated Sep. 18, 2020.
Final Office Action for U.S. Appl. No. 16/248,759, dated Oct. 6, 2020.
Final Office Action for U.S. Appl. No. 15/671,133, dated Oct. 7, 2020.
Final Office Action for U.S. Appl. No. 16/357,316, dated Oct. 8, 2020.
Final Office Action for U.S. Appl. No. 16/183,632, dated Oct. 9, 2020.
Office Action for U.S. Appl. No. 16/590,347, dated Oct. 13, 2020.
Office Action for U.S. Appl. No. 16/449,717, dated Nov. 9, 2020.
Final Office Action for U.S. Appl. No. 13/622,702, dated Nov. 30, 2020.
Final Office Action for U.S. Appl. No. 15/674,480, dated Dec. 7, 2020.
Office Action for U.S. Appl. No. 16/168,813, dated Dec. 8, 2020.
Office Action for U.S. Appl. No. 16/600,395, dated Dec. 22, 2020.
"Professional Casino Slot Machine", Posted at www.vbtutor.net/VB.Sample/vbslot2.htm on Oct. 20, 2009.
Final Office Action for U.S. Appl. No. 16/559,553, dated Jan. 21, 2021.
Final Office Action for U.S. Appl. No. 16/449,717, dated Jan. 29, 2021.
Notice of Allowance for U.S. Appl. No. 15/811,654, dated Feb. 3, 2021.
Notice of Allowance for U.S. Appl. No. 14/017,150, dated Feb. 5, 2021.
Final Office Action for U.S. Appl. No. 16/794,212, dated Feb. 17, 2021.
Office Action for U.S. Appl. No. 16/351,416, dated Feb. 23, 2021.
Office Action for U.S. Appl. No. 15/674,480, dated Mar. 25, 2021.
Final Office Action for U.S. Appl. No. 16/219,940, dated Mar. 26, 2021.
Office Action for U.S. Appl. No. 16/183,632, dated May 4, 2021.
Office Action for U.S. Appl. No. 16/559,553, dated Jun. 1, 2021.
Notice of Allowance for U.S. Appl. No. 16/579,754, dated Jul. 16, 2021.
Office Action for U.S. Appl. No. 13/622,702, dated Jul. 19, 2021.
Office Action for U.S. Appl. No. 16/357,316, dated Jul. 20, 2021.
Office Action for U.S. Appl. No. 16/993,154, dated Jul. 28, 2021.
Final Office Action for U.S. Appl. No. 16/351,416, dated Sep. 1, 2021.
Office Action for U.S. Appl. No. 15/671,133, dated Sep. 2, 2021.
Notice of Allowance for U.S. Appl. No. 16/794,212, dated Sep. 3, 2021.
Office Action for U.S. Appl. No. 17/020,761, dated Sep. 9, 2021.
Office Action for U.S. Appl. No. 16/916,001, dated Sep. 17, 2021.
Notice of Allowance for U.S. Appl. No. 16/870,802, dated Sep. 22, 2021.
Decision on Appeal for U.S. Appl. No. 15/427,308, dated Sep. 10, 2021.

* cited by examiner

CONFIGURABLE VIRTUAL GAMING ZONE

CROSS REFERENCE TO RELATED APPLICATION

This application is a continuation of U.S. application Ser. No. 15/427,308, filed Feb. 8, 2017, and entitled "RECONFIGURABLE VIRTUAL GAMING ZONE," which is hereby incorporated herein by reference, and which in turn is a continuation of U.S. application Ser. No. 13/801,271, filed Mar. 13, 2013, and entitled "RECONFIGURABLE GAMING ZONE," now U.S. Pat. No. 9,607,474, which is hereby incorporated herein by reference.

This application is related to U.S. patent application Ser. No. 12/797,610, filed Jun. 10, 2010, entitled "LOCATION-BASED REAL-TIME CASINO DATA," the content of which is incorporated in its entirety for all purposes.

BACKGROUND OF THE INVENTION

Casinos have long sought new ways to induce play on the gaming devices. They try to increase player time on gaming devices, average wager amount, and speed of play. Various techniques have been used in attempts to gain higher casino profits. One such technique in the casino gaming industry is the addition of bonus opportunities. This usually takes the form of an additional bonus game in conjunction with a base game of a gaming device.

As another avenue to encourage play, casinos adopted a new technology in the form of player tracking systems. In a player tracking systems a player registers for a player-tracking card at a registration desk. The player is typically given a plastic magnetic strip player card for use while playing gaming devices on the casino floor or at the card tables. Each player card has an ID on it that associates it with a player record in a player tracking database. Players are awarded loyalty points, credits or other representations of value. Such awards can then be redeemed at a later time.

More recent additions to the casino player loyalty systems provide bonus prizes or prize pools that are periodically given to players on a random basis (e.g. mystery bonusing, mystery jackpot). This gives the player a more instantaneous and larger reward versus the slow accrual of loyalty points. This is done for several reasons: to help induce play on the gaming device, to encourage players to become carded players; to create player loyalty for the casino, and to provide bonus prizes without modifying the base gaming device software.

However, these methods of awarding bonuses have several limitations. They may require that a player become a member of a club when they wish to remain anonymous. Also, these methods require that a casino patron be engaged in wagering activities.

Group games involving many players are known to be implemented in a predefined area, where a number of gaming machines on the casino floor are roped off for the special event. Only machines within the enclosed area are eligible for participating in a group game or a bonusing award. One popular game type set up in this manner is the slot tournament game. From the casino operator's perspective, such a rigid physical configuration is time-consuming to set up, tying up valuable assets, and lack the flexibility to be reconfigured quickly. From the player's perspective, such an approach also requires them to move around to find the sweet spot—the location where the special machines and awards are set up. Not only this is inconvenient for some players, it interrupts their wagering activities.

With the advent of mobile technology, additional opportunities for accommodating casino patrons have arisen. Handheld gaming devices allow players to participate in wagering activities in traditional, as well as non-traditional gaming areas, such as a hotel room, a restaurant, or next to a pool. Certain restrictions apply to handheld gaming devices, in which the device's location determines the eligibility of the device to conduct wagering activities or particular game-related features.

There is a continuing need to provide new and different gaming devices and gaming systems as well as new and flexible ways to provide awards to players on mobile and traditional gaming devices, including bonus awards and special game features that enhance their playing experiences.

SUMMARY

Embodiments are described herein in the context of a reconfigurable gaming zone. The present disclosure relates generally to gaming systems, more specifically to game events control systems with in a gaming system, and even more specifically to game events control systems to reconfigure gaming zones in gaming systems.

In one embodiment, a method of operating a zone-based gaming activity includes generating, in response to a request, a reconfigurable zone, determining one or more eligible participants, and modifying said zone to change the number of eligible participants.

In another embodiment, a method for configuring the operating constraints of a zone-based gaming activity including defining a location for deploying the zone, defining the size of a zone, defining one or more criteria for selecting eligible participants, and defining one or more criteria for modifying the zone.

In still another embodiment, a method of operating a zone-based gaming activity includes randomly generating, in response to a request, a location of a reconfigurable zone, randomly determining one or more eligible participants, and modifying said zone to change the number of eligible participants.

The present invention provides other hardware configured to perform the methods of the invention, as well as software stored in a machine-readable medium (e.g., a tangible storage medium) to control devices to perform these methods. These and other features will be presented in more detail in the following detailed description of the invention and the associated figures.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings.

DESCRIPTION OF EXAMPLE EMBODIMENTS

Embodiments are described herein in the context of a reconfigurable award zone. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 1:
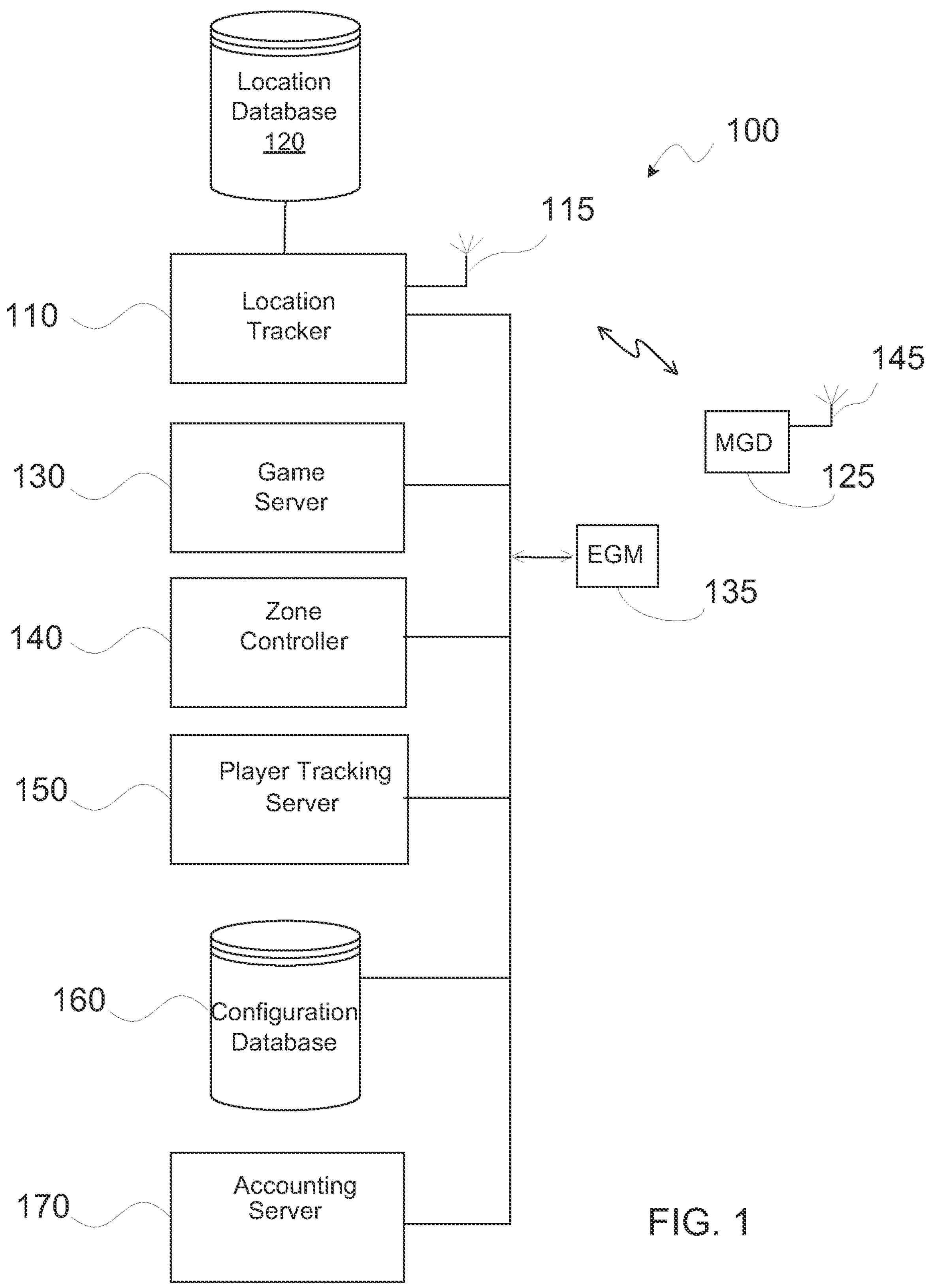
FIG. 1 illustrates an example schematic of a gaming network.

FIG. 1 illustrates an example schematic of a gaming system. The gaming system, identified in its broadest aspects as 100, may be configured to communicate and/or control a plurality of gaming devices or electronic gaming machines (EGMs) 135 and a plurality of mobile gaming devices (MGDs) 125. The gaming system 100 may have a game server 130 configured to communicate with a zone controller 140, location tracker 110, player tracking server 150, configuration database 160, and accounting server 170.

Zone Controller

The zone controller 140 conducts the operation of the reconfigurable award zone game. In one embodiment, the zone controller 140 may be a standalone local controller networked with the plurality of EGMs 135 within a specific area (e.g., such as a carousel of slot machines, gaming devices near the door, and the like) and/or a number of MGDs 125 that are grouped together in a logical group (e.g., spinning reels slot machines, video poker devices, table games, progressive slots, mobile gaming devices, and the like). In another embodiment, the zone controller may be integrated in the EGMs 135. When integrated in EGMs 135, the zone controller is a software application that runs inside the gaming device or slot machine, leveraging hardware available within the slot machine to perform its functions. Regardless of whether the zone controller is implemented as a standalone device or a software application, the zone controller can be located near the EGMs 135 to simplify network connections, or can be located remotely from the EGMs 135 and communicating over a suitable network.

The zone controller 140 may communicate with the MGD 125 and EGM 135 via either a wireless link, a wired connection, or an optical connection. The network architecture maybe that of a client-server network, a token-ring network, a peer-to-peer network, or an ad-hoc wireless network. Though not a requirement, it is desirable for the zone controller to be able to have both wired and wireless capabilities. In one embodiment, the zone controller may be configured for networking with fixed gaming devices over a wired Ethernet network, networking with mobile gaming devices over a short range Bluetooth wireless network, and networking with the system servers (such as Player Tracking server, Location Tracking server, etc.) over a longer range WiFi, WiMax, or Cellular connection. In another embodiment, the entire network connection may be wireless.

When using wireless communication, any type of standard or protocol may be used to implement the communication. Examples of acceptable wireless communication protocols include CDMA, GSM, and related derivatives. In one example, the zone controller 140 uses a wireless communication standard such as Bluetooth™ to communicate with portable wireless devices, although other wireless communication protocols such as IrDA (Infrared Direct Access), IEEE 802.11n, IEEE 802.11b, IEEE 802.11x (e.g. other IEE802.11 standards), Zigbee, Wireless USB, Ultra Wide Band, Near Field Communication (NFC), and HomeRF may also be used. Any type of wireless transmission may be implemented as well, including but not limited to optical, electromagnetic energy, radio or other frequency communication and infrared-type communications.

In a typical deployment cycle, the zone controller 140 retrieves the operating parameters of the award zone, implements the parameters to create an award zone, provisions the zone-based game feature, selects the eligible participants, notifies them, operates the periodic zone modification, determines the new number of participants, notifies them, stores the game states, monitors for the zone modification signal, decides if the gaming ending condition occurred, and awards the prize(s) to the remaining eligible participant(s) when the game ends, if applicable.

Antenna and Wireless Interface

In one embodiment, zone controller 140 may be configured to communicate with MGD 125 and EGM 135 via an antenna 115. Antenna 115 may receive and transmit signals to and from the game system 100 and receive and transmit signals from a wireless interface 145 of the MGD 125 or EGMs 135. As is known in the art, the wireless interface 145 may also operate to demodulate, decode and otherwise process information to and from remote locations. Any known wire or optical communication system may be used and are well known in the art and will not be discussed in detail herein.

Gaming Devices

Both the EGMs 135 and MGDs 125 may be referred to as gaming devices. The electronic gaming machines (EGMs) 135 may correspond to gaming devices typically found in the gaming environment such as slot machines, video poker machines, video blackjack machines, video keno machines, video bingo machines, pachinko machines, and video lottery terminals. In one embodiment, the EGMs may be positioned at or near play table games so that for players who prefer to play table games, the zone controller 140 may communicate with the gaming devices associated with players at the gaming tables. The EGM 135 may also be smart TVs, kiosks, or electronic game tables such as electronic tables made by well known gaming manufacturers such as Digideal Corporation, Elektroncek, Shuffle Master, Pokertek, and others.

The mobile gaming devices (MGDs) 125 may be any portable electronic device such as a cell phone, a smart phone, a portable media player, a laptop computer, a tablet computer, a portable gaming device, a personal digital assistant or the like.

Thus, it is contemplated that communication between the zone controller 140 and EGM 135 and MGD 125 may be located within the gaming establishment where players are allowed by gaming regulations to participate in a gaming activity. When a zone controller 140 notifies EGM 135 and MGD 125 that they are eligible to participate in the zone play, the notification goes to all devices in the manner that is appropriate for that device. By looking up the EGM's 135 and MGD's 125 registry database, or by querying the device itself, the message can be tailored to the device's capabilities. For example, a slot machine's or EGM's notification may go through the Player Tracking device installed on the machine, while the MGD 125 may receive a text message.

Game Server

Game server 130 may be configured to manage and control the operation of games of chance played on gaming devices 135 and MGDs 125. The game server 130 may be configured to store and download games, transmit game software and outcomes relating to the game of chance being played, or, alternatively, be configured to determine a winning game outcome and/or appropriate payout. The game server may be configured to perform any other function desired by the user such as determining bonus events, payouts, and the like.

Accounting Server

Accounting server 170 may be configured to receive, store and transmit accounting information relating to a player's account. Accounting information may include any accounting information such as the amount of input of monies, payment of monies, wagers and similar financial events occurring at the MGD 125 or the EGM 135. The accounting server 170 may also be configured to store award amounts or running totals associated with particular groups or categories of player preferences, interests or attributes.

Player Tracking Server

Player tracking server 150 may be configured to store player tracking information. Player tracking information may include player tracking points/credits accumulated by the player, the amount of wins and losses by the player, and any other player account information desired to be tracked. The player tracking information may be combined or associated with other player information. For example, a player may be enrolled in the gaming establishment's player club and may be awarded certain complimentary offers as that player accumulates points/credits. In use, after the player registers with the gaming device (e.g. swiping a player tracking card, bumping an NFC-capable smart phone, entering authentication information such as an identification and/or personal identification numbers), the player tracking server 150 can record the player's wagering activity.

Alternative Servers

Although not illustrated in FIG. 1, gaming system may have other additional servers such as a marketing/promotion server to transmit marketing and promotional information to MGD 125 and/or EGM 135, auditing server to audit gaming information stored in the various databases, authentication server to authenticate the MGD 125, EGM 135, software, and/or players, an administrative server to track expenditures by a player during his visit to the gaming establishment, a game history server to serve up the game's historical track records, a concierge server to assist in making reservations at restaurants or purchasing tickets for entertainment events, and other similar servers.

Configuration Database

Configuration database 160 may be configured to store a plurality of zone information and operating parameters associated with each plurality of zone information. The operating parameters may include information such as the initial zone size, frequency of game deployment, modification type (e.g., expansion or contraction), frequency of game modification, the number of desired participants, eligibility requirements of participants, rate of modification of the zone, game features (e.g., win multipliers, free spins, mystery bonus, jackpots, and the like) associated with the zone, gaming awards, and any other operating parameters desired by the gaming establishment. The value for each of the plurality of parameters may be predefined or randomly selected. For example, the zone location can be predefined at a specific area within the gaming establishment, such as at coordinate (x, y, z) on a casino floor. The zone location may be any predefined area such as a sphere having a radius of 15 yards. In another example, the radius of the sphere may be randomly selected using a random number generator. In yet another example, the range of the zone location may be randomly chosen within a predefined range appropriate for the gaming establishment such as 1 yard to 25 yards.

Configuration database 160 may also be configured to store gaming data such as game state data and operating data of the reconfigurable award zone game. Storing gaming data of the award zone game allows recovery of the gaming activity and information when unexpected events such as a power failure, a sudden loss of communication on a mobile gaming device 125, and the like occur. The stored gaming data allows for recovery of the game of chance after unexpected or expected pauses, such as a prescribed half-time break for the players. Furthermore, the game state and operating data can also be used to reconstruct the game for the purposes of auditing, game analysis, player dispute resolution, and the like. Example game states include initialization state, zone modification state, players notification state, award state, participant determination state, and the like. Example operating data may include the current number of participant in the game, player identification, game of chance selected, the amount of rewards remaining, current zone size and location, current number of zone modification, current time, and the like.

Location Tracker and Database

The location of gaming devices 135 and MGD 125 within the gaming establishment may be determined using location tracker 110. Location tracker 110 may determine the location of the EGM 135 and MGD 125 within an active zone, time at the specification location, amount of time spent at the location, and any other location information and data. The location information and data may be stored in location database 120. Although location tracking for fixed devices, such as traditional gaming machines or game tables, may not be necessary, the gaming establishment may still desire to record the location information and data. For mobile gaming devices 125, location tracker 110 may periodically update the location of each MGD 125. For example, the location of each MGD 125 may be tracked and updated every ten (10) seconds, thirty (30) seconds, thirty (30) minutes, or any other desired time period. The tracking of both fixed 135 and mobile gaming devices 125 within a zone is important to assure fairness to each of the players.

Any known tracking technology may be used to track the location of the EGM 135 and MGD 125. For example, U.S. Pat. No. 7,580,995 entitled "Systems and methods for locating mobile computer users in a wireless network" describes a WLAN technology for locating and tracking mobile devices, which is hereby incorporated by reference.

Location and detection of the EGM 135 and/or MGD 125 may be determined as a function of received signal strength indicator (RSSI) values obtained from the EGM 135 and/or MGD 125. As a general rule, the higher the signal strength at an access point (AP), the closer a transmitting wireless device is presumed to be to the AP. Changes in the signal strength as the wireless device moves about the gaming establishment allows for tracking the wireless device. For example, if there are at least three APs that receive a signal from the wireless device, trilateration/triangulation can be used to determine the location of the device within the gaming establishment. Trilateration is a method of determining the position of the wireless device as a function of the distances between the wireless device and each of the APs. A detailed explanation of trilateration will not be described further to prevent obfuscation of the invention. However, various locationing methods that may be used with the present invention are described in "Location Systems: An Introduction to the Technology Behind Location Awareness," by Anthony LaMarca and Eyal de Lara, Morgan & Claypool Publishers, 2008, ISBN #978-1598295825, which is incorporated herein by reference for all purposes.

Additionally, EGMs 135 and/or MGDs 125 may be operable to include conventional position location hardware and software. For example, the mobile device 125 may include one or more of positioning technologies such as global position system (GPS), wireless assisted GPS (A-GPS), cell identifier (CELL ID), Forward Link Trilateration (FLT), wireless assisted protocol (WAP) based location, geography markup language (GML) based location, and the like. Location tracker 110 may store the location of every EGMs 135 and/or MGDs 125 in database 120. Location tracking server 110 may track the location of all gaming devices on the casino floor in substantially real time (or as close as possible), and feed the data to database 120. Location database 120, in addition to having a live location feed of all gaming devices on the casino floor may also contain a layout of the gaming establishment. This allows the gaming system 100 to know where each EGMs 135 and/or MGDs 125 is within the gaming establishment at any desirable granularity of time. The gaming establishment may be any location where games of chance may be played such as a casino, hotel, sports bar, riverboat, grocery store, sports stadium, airplane, or the like.

In one embodiment, the gaming devices themselves may determine their own location and transmit its location to the location tracker 110. Each EGMs 135 and/or MGDs 125 may detect its location within the gaming establishment and transmit its location to location tracker 110 for storage in the location database 120. In another embodiment, an external, trusted gaming device (e.g. an external device that is registered and authenticated) such as, for example, an intermediary gaming trusted device maybe attached to the gaming device and independently detect and transmit the gaming device's location to the location database 120. The location of the gaming devices 125, 135 may be determined periodically or on-demand at any desired time interval. In another embodiment, location tracker 110 may ping the gaming devices 125, 135 for their locations. Once pinged, gaming devices 125, 135 may transmit their locations to location tracker 110.

Figure 2:
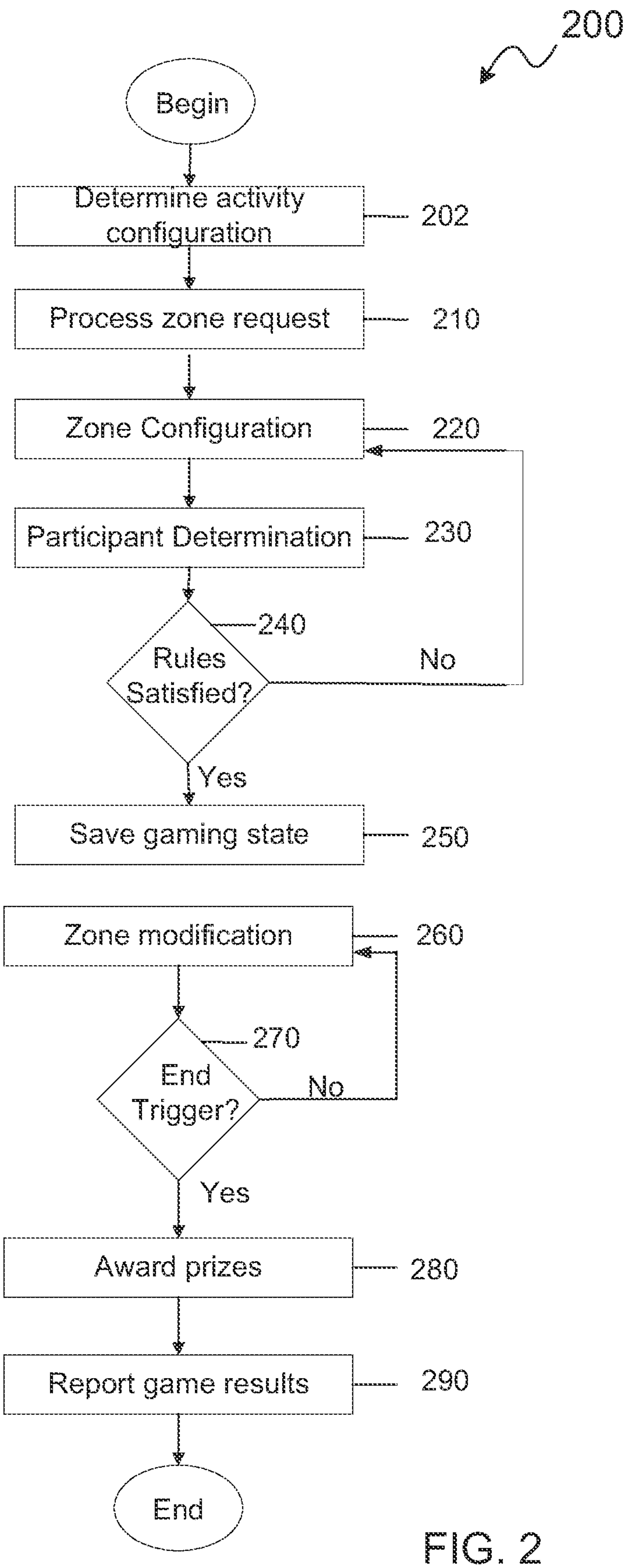
FIG. 2 illustrates an example method for configuring zone-based game play.

FIG. 2 illustrates an example method for configuring zone-based game play. The process may begin with determining the activity configuration 202. This includes determining the operating constraints such as the various attributes of the zone, participants, and any other gaming related constraints. For example, the location and initial size of the zones are operating constraints. Additional operating constraints will be discussed below. In one embodiment the operating constraints are determined prior to initiation of the activity and stored in a database, such as configuration database 160 illustrated in FIG. 1. In other embodiments, some of the operating constraints may be determined as needed or desired after initiation of the activity. For example, eligible participant criteria could be selected after initiation if insufficient eligible participants are available with the current criteria. Furthermore, the operating constraints can be preset, or randomly set at the time of deployment of the award or game of chance.

Zone Request

A zone request may be processed at 210. The zone request may be processed by, for example, a zone controller 140 as illustrated in FIG. 1. The zone request may be made directly and manually by a venue staff member. Alternatively, a venue operator may define zone requests in advance of a zone start time that are stored until the start time, or shortly before the start time, at which point they are processed. The zone initiation process may be scheduled to occur periodically, randomly, or when a predetermined condition is satisfied. For example, when an aggregated bet amount has been wagered in the zone, when there has been two (2) or more four-of-a-kind in the previous two (2) hours, when there were more than 50 game losses within one (1) minute in the zone, when the number of players in an area exceeds 100, or any other similar predetermined conditions.

In another embodiment, the zone request may be processed by a gaming server, such as, for example, gaming server 130 illustrated in FIG. 1. The gaming server may be programmed to automatically generate and process zone requests based on a specific time, the location of gaming devices 125, 135, preference information obtained from a player tracking server, such as, for example, player tracking server 150 illustrated in FIG. 1, or any other predefined criteria. For example, a zone initiation request may be generated only if the density of active gaming devices in a particular area reaches a predefined threshold value.

The zone initiation request may be associated with configuration parameters for the zone-based game features to be played. The associated parameters may be retrieved when needed, such as, for example, from database server 160 illustrated in FIG. 1. In an alternative embodiment, the parameters may be retrieved from a memory in the zone controller 140 if the configuration parameter are pre-emptively pushed to the gaming server.

The configuration parameters may be predefined or randomly chosen. The parameters may be within a range of permissible values or operating constraints. The permissible values or operating constraints may be presented by a server, such as, for example, game server 130 or zone controller 140 as illustrated in FIG. 1. The parameters, whether predefined or defined in a zone request, may include at least the identification of the type of game event to be conducted (i.e., progressive jackpot, mystery bonus, promotional award, free game vouchers give out, upcoming events, win/loss trend for the area, and the like), criteria for starting the game (e.g., a minimum number of participants), zone parameter information, game times (e.g., start and end times), participant eligibility criteria, prize identification, and the like.

The parameters can be grouped into zone initialization parameters (i.e., size, location), game feature parameters (type of game features, casino promotions being conducted, and how they operate), players parameters (i.e., who is eligible, at what level, for how long), zone operating parameters (i.e., contracting zone, expanding zone), and the like.

These above groups may also include parameters such as the initial zone size, frequency of deployment, modification type (expansion or contraction), frequency of modification, the number of desired participants, eligibility requirements of participants, the rate of modification of the zone, the game feature (such as win multipliers, free spins, mystery bonus, jackpots, etc.) to be provisioned for the zone, the one or more awards, and the likes. The value of each parameter can be preset, or randomly chosen. For example, the zone location can be preset at coordinate (x,y,z) on a casino floor, the zone size to be spherical, and the radius of the sphere is 15 yards. These values, when randomly chosen, can be generated by a random number generator to be within one or more ranges that are appropriate for the casino's particular size.

Once the parameters are set, the parameters may be stored in a database, such as, for example, configuration database server 160 as illustrated in FIG. 1, for later retrieval by the zone controller. Alternatively, the parameters may also be pushed from the database to the appropriate zone controller, prior to the activation of the zone activity, for use when triggered by a predefined event (e.g., when there are more than 10 players at 7 pm on or near a game machine carousel).

Zone Activation

A zone must be selected and activated at 220. In one embodiment, the zone may be selected and activated upon receipt of an activate request. The zone selection can be randomly selected from a set of stored, pre-determined locations. The selection can be made by casino personnel or other individuals with the proper authority. The selection can be made based on past and/or current conditions. For example, areas with low traffic or newly installed gaming machines may be chosen. Another example would be to identify particular areas on days of the week or time of the day and randomly select a location within those areas.

Zone activation for a given activity request may be made by a controller, such as, for example, the zone controller 140 illustrated in FIG. 1. First, a geographic position may be selected from available space or gaming machines, henceforth designated as the focus. The focus will form the approximate center around which a zone is created. The focus needs not to be one dimensional. The focus can be a point, a line, an area, or a volume. It should be understood that because the zone can have an arbitrary shape, the term focus is not restricted to its geometric definition. The focus can be randomly selected or determined by parameters in the zone request. The focus can coincide with a specific gaming device or an arbitrary geographic location. In one embodiment, more than one focus may be selected.

The available space can be defined by a venue operator to be the whole of their property or some subset. Gaming regulations may also restrict the allowable available space. In addition, a casino operator may desire to prevent particular areas from being allowed to be included in a zone. The available area can be predetermined or be set by one of the zone request parameters. The available space does not need to be restricted to one contiguous area. Various embodiments of zone configurations will be discussed in greater detail below.

After the focus is selected an initial zone may be generated based on focus position. The zone can be a predetermined size/shape or obtained from the zone request. Information supplied by the location database server 120 can be used for the generation of the zone. For instance, the casino floor map where gaming devices are located can be provided when the zone is being specified, whether randomly or predefined. The zone can be of any arbitrary shape, such as a circle, triangle, rectangle, spiral, or any other shape. For example, by specifying a radius associated with the selected geographic position, a circular zone is created. In another example, a line is drawn on the floor map, and locations within 20 feet of the line may be defined to be within the zone (i.e., defining a rectangle centering on the initially drawn line to be the logical boundaries of an active game-event zone).

The zone can be implicitly defined by selecting specific gaming devices near the focus. If more than one focus has been selected, a zone for each focus will be generated. A zone may be associated with a geographic boundary such as the perimeter of a casino floor or banks of gaming devices. A zone may be associated with a logical boundary, corresponding to access points in a wireless network. Optionally, zone parameters may be predetermined and stored in a database, such as, for example, the configuration database server 160 illustrated in FIG. 1. In this embodiment, the zone parameters may be pushed, pulled, selected, randomly or otherwise, and supplied with the zone request and activation.

Participant Determination

With a preliminary zone created, the potential participants may be determined at 230. The potential participants may be determined by calculating the number of individuals within, near, or adjacent the zone. This may be determined via any known methods. For example, individuals at stationary gaming devices can be located, even if they remain anonymous. Mobile individuals can be located using a location monitoring system, such as a monitoring system described in U.S. Pat. No. 6,353,390, entitled "Method and system of configuring a boundary and tracking an object thereby", which is incorporated by reference herein. It should be understood that any method for locating individuals can be applied.

Depending on the zone request parameters, all individuals may be eligible for participation in the game. Optionally, the zone request parameters may require that only a subset of all individuals within the zone to be eligible, such as players who have been actively playing the gaming device for more than ten (10) minutes. The parameters could be related to player memberships (e.g., Gold Club members), play history (e.g., aggregate expenditures at the venue over the last month), and the like. Such determination may depend on being able to identify the potential participants via a player database, such as, for example, player tracking server 140. Optionally, an invitation to participate in the game may be transmitted to the gaming devices. The players at the gaming devices may then be required to respond within a specific time interval in order to participate in the event.

A determination of whether gaming rules are satisfied may be made at 240. If the gaming rules are not satisfied, the method may return to step 220 to re-activate the zone. For example, the number of potential participants may be evaluated. If there are too many potential participants (e.g. as required in the zone request parameters) which does not satisfy the gaming rules at 220, a zone reduction may occur at 220. Several methods can be used to reduce the zone. In one embodiment, the physical dimension of the zone can be decreased. For example, the radius of the zone may be decreased. In another example, an area based on a logical unit, such as a bank of gaming machines can be removed. In another example, the number of gaming devices may be removed randomly from the zone.

Alternatively, in another embodiment, the rules may not be satisfied at 240 if there are insufficient potential participants. In this embodiment, the zone may be enlarged at 220. A physical dimension of the zone can be increased, such as to include more gaming devices. In another example, the area may be based on a logical unit, for example, a bank of gaming machines can be added.

The process of participant determination and zone reconfiguration repeats until the number of potential participants required in the zone request parameters is satisfied. This number does not necessarily have to be a specific number; the zone request parameter could consist of a range of participants. For example, a minimum and maximum number could be specified.

As illustrated above, the players and gaming devices inside of a zone may participate in the zone activity. However, the reverse is also possible. In other words, in one embodiment, only participants and gaming devices outside a zone can participant. In another embodiment, other hybrid approaches may be possible. In one example, a certain percentage of players from outside the zone and a certain percentage of players inside the zone may participate in the game.

Saving Game Event State

The state of the game zones and their events may be saved at 250. The state of the zone may be saved in order to restore the game at a later time. For instance, a power interruption could require that a zone and its associated gaming event be restored when power is re-instituted. In another example, the zone play event maybe partitioned into multiple time segments, and needs to be restored upon resumption of the zone activity. The state of a zone and its associated events may be saved periodically and/or at any predetermined time interval. The time interval may be every thirty (30) seconds, every ten (10) seconds, every hour, or any other desired time interval.

The game state information may include the foci, zone parameters, participant information, zone request parameters and any other information required in order to complete the game. The saved data may reside in a database, such as, for example, the configuration database server 160 illustrated in FIG. 1 or in zone controller's 140 memory.

Zone Modification

The zone may be modified at 260. The zone may be modified for any number of reasons. For example, a modification can be made to decrease or to increase the number of participants playing the game. The zone may be increased or decreased at various intervals. The intervals may be predetermined or determined by the game state parameters. For example, in a zone reduction approach, participants that are outside the zone will automatically be removed. In another example, participants can gain access to the zone activity by moving into the zone in order to increase participants in the zone.

A notification may be transmitted to the participants informing them of the zone modification. For example, participants losing eligibility to play the game may be transmitted a removal notification. In another example, participants gaining eligibility, may be transmitted an acceptance notification to be included in the game.

Various indicators can also help the participant identify their current status. For example, pop up window on the player terminal, sounds, screen color change, flashing symbols, and the like may help to indicate whether the participant is part of or not part of the game. Maps of the game floor that include graphical depiction of the zone, the active players, and the eliminated players can also be displayed in the venue and/or at the player terminals as desired.

In one particular implementation that uses the zone reduction approach, after the zone is reduced in size, any participants located outside the zone may be eliminated from the game, either temporarily or permanently eliminated. In another embodiment, a participant may re-enter the activity by moving and playing a gaming device in the modified zone. In yet another embodiment, a participant may be required to satisfy a condition in to re-enter the zone. For example, the condition may be that the participant is offered a chance to buy their way back into the activity. Another condition may require the participant to begin a wagering activity within the zone to again become an eligible participant.

Trigger Condition

A determination of whether a trigger condition has occurred may be made at 270. A trigger condition may be time-based (i.e., the zone-based event expires after 5 minutes, and the like), event-based (i.e., terminate the zone-based activity when a player hits a jackpot, when there is less than a predetermined number of remaining players after a zone reduction, when there is more than 100 players after a zone expansion, when there is at least 10 zone modification iterations, and the like), or randomly chosen at some point in time. The triggering conditions may be predefined or, for example, specified in the zone request parameters.

If the condition is triggered at 270 prizes may be awarded at 280. If the trigger condition is not satisfied, the process returns to the zone modification step 360. In the event that an insufficient number of participants remain after a zone reduction, for example, zero participants remain in the current zone, the most recent set of participants may be used. For example, all remaining participants may be awarded the prize. In another example, a random subset of participates may be selected to receive the award.

Award Prizes

Prizes may be awarded at 280. In one embodiment, independent of how the winning participants are determined, the award may be provided to each winning participant. In one embodiment, a notification may be transmitted to either all the participants or just the winning participants. The notification may be transmitted to the gaming devices from a server, such as, for example, zone controller 140, game server 130, player tracking server 150, accounting server 170, configuration database server 160, or any other desired server.

The award may include at least the prize won, identifies the winner or list of winners, how to claim the prize, and any other information desired. Optionally, the notification sent to non-winners may include information that they did not win and a suggestion that they try again. In either case, the notification may include an invitation to play another game. The game results may also be reported at 290 to all the participants.

Figure 3:
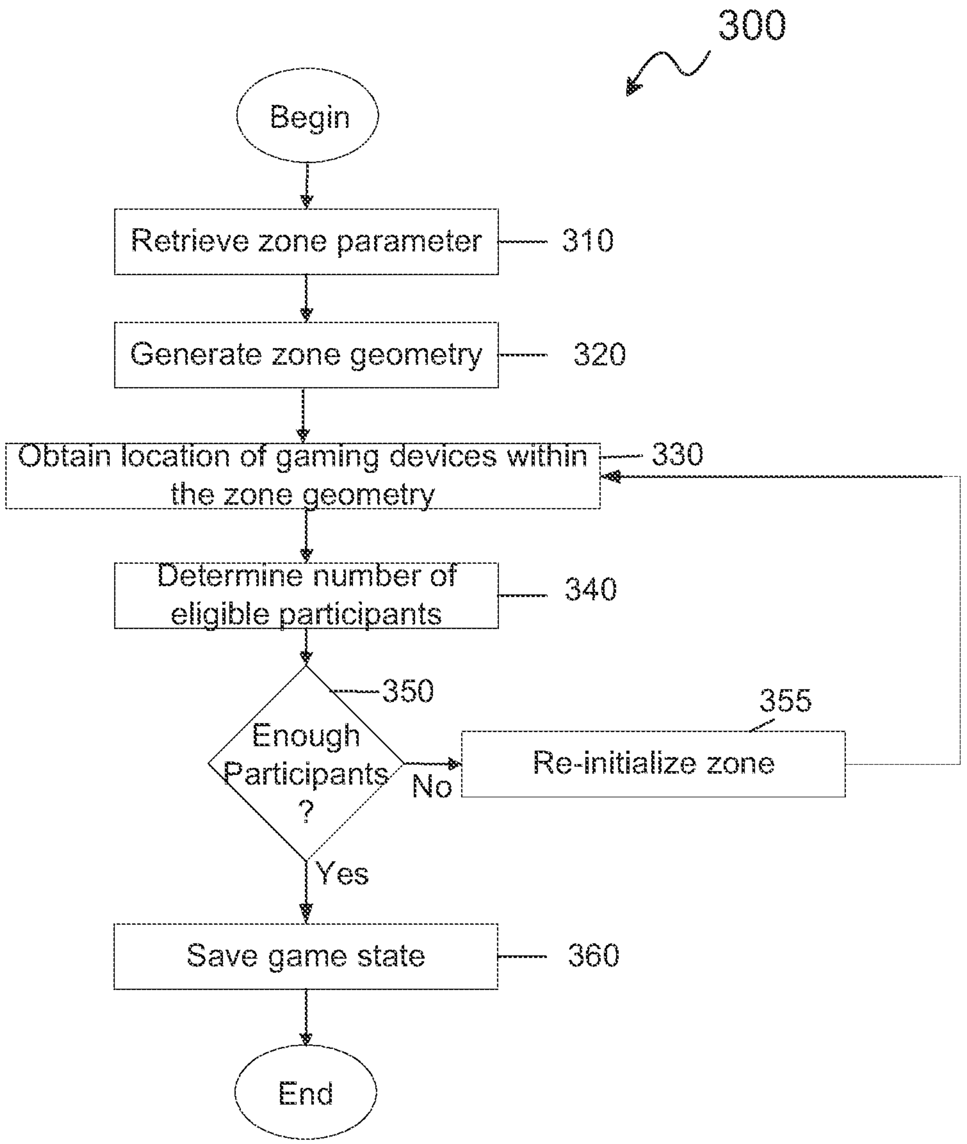
FIG. 3 illustrates an example flow chart for zone modification.

FIG. 3 illustrates an example flow chart for zone configuration. The method 300 may start with retrieving the zone parameters at 310. The zone parameters may be retrieved from a server or database, such as zone controller 140 illustrated in FIG. 1. In one embodiment, the zone parameters may be based upon or associated with a zone request. The zone request may include the zone location, the zone area, and the zone shape, as further described and illustrated in FIG. 5.

The zone geometry may be generated at 320. The zone geometry may be generated by determining a virtual boundary calculated from the configuration parameters (i.e., focal point and a radius for a circular zone, and the like). The virtual boundary may then be mapped onto a physical area of the casino floor thereby translating the zone area/volume data of the virtual boundary into physical coordinates.

The location of all gaming devices within the zone geometry may be obtained at 320. The location of the gaming device may be obtained, for example, from zone controller 140 illustrated in FIG. 1. The physical coordinates of the gaming machines may be obtained. This is feasible since, as discussed above, the physical location of the gaming machine, map of the casino floor, and any other locations, may be stored in a database, such as the location database 120 illustrated in FIG. 1.

The number of eligible participants may be determined at 340. Each mobile gaming device associated with a participant within the zone geometry may be considered an eligible participant. Additionally, any gaming machine being played by a player or a player playing at a gaming table may be considered an eligible participant. In one embodiment, the eligibility of a participant may be dependent on the zone request parameters.

A determination of whether there are enough participants may be made at 350. A minimum or a maximum number of participants may, for example, be one of the parameters included in the zone request. If there is not a sufficient number of eligible participants at 350, the zone geometry may be re-initialized at 355. In one embodiment, the zone area may be increased (not enough participants) or may be decreased (too many participants) by a pre-defined amount. In other embodiment, an estimate of the necessary zone size is calculated based on the current number of eligible participants and the minimum number of allowed eligible participants. In yet another embodiment, the re-initialized zone may include a different shape. In another embodiment, the zone request may be cancelled and a new one may be generated. If the number of eligible participants satisfies the configuration limit of eligible participants, the method 300 may continue with saving the state of the game at 360 or step 250 illustrated in FIG. 2.

Monitor Activities

Figure 4:
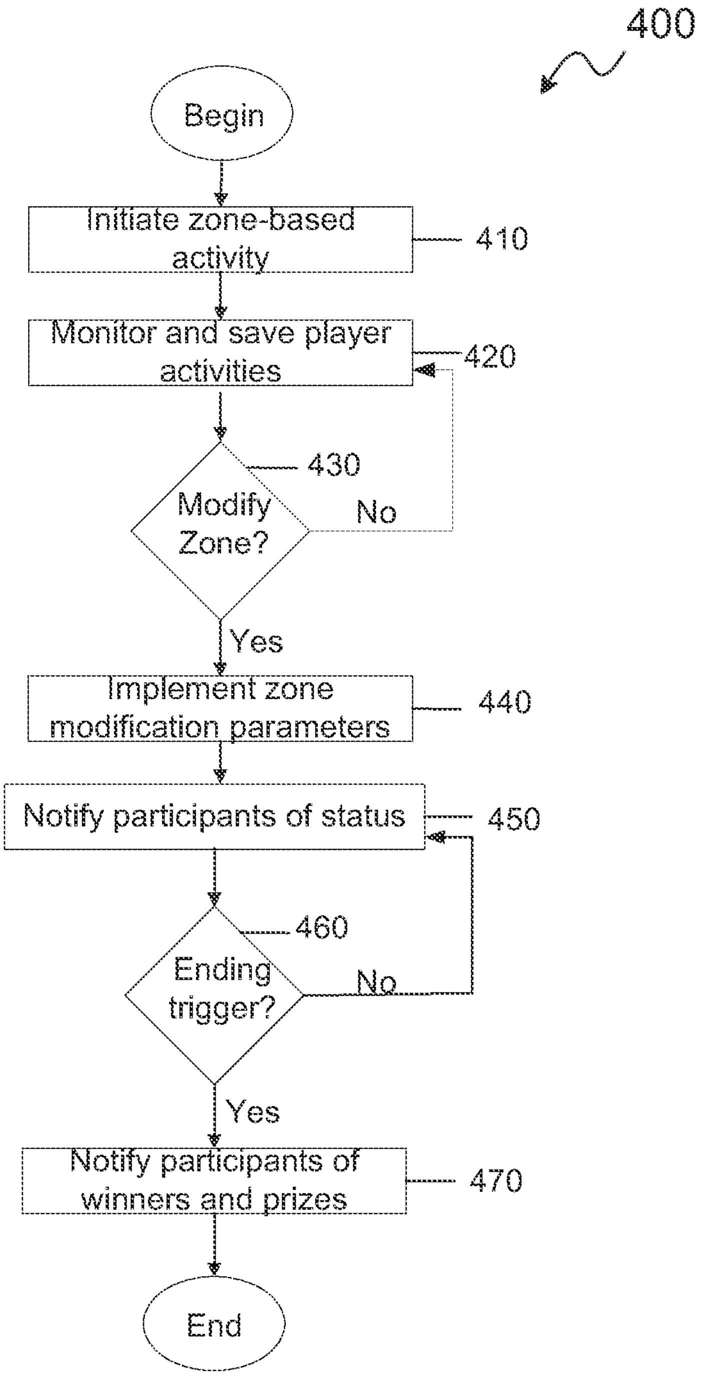
FIG. 4 illustrates an example flow chart for the zone reduction step.

FIG. 4 illustrates an example flow chart for zone modification. The zone-based activity may be initiated at 410 by, for example, the zone controller 140 illustrated in FIG. 1. The positions of the participants, as determined from the mobile and stationary devices, described above, may be monitored. The participant activities may also be monitored at 420. The activities may include wagering actions, bonus activity, and any other action that may be relevant for determining participant eligibility to play the game.

Zone Modification

In addition to monitoring player activities at 420, the zone controller may also track the time the game activity begun. A determination of whether to modify the zone may be made at 430. The determination of whether to modify the zone may be made periodically or at predetermined period of time after the game activity began. In one embodiment, the determination of whether to modify the zone may be predefined in the zone request. If such time has not occurred, the participants' positions and activities continue to be monitored at 420. However, if it is determined that it is time to modify the zone at 430, then the zone modification parameters may be implemented at 440.

Implement Zone Modification Parameter

Although discussed in detail with reference to FIG. 5, the zone may be modified by either being decreased or increased, thereby decreasing or increasing the number of eligible participants, respectively. In some zone activity, it may be desirable to decrease the zone and thereby decreasing the number of participants to heighten the excitement for the remaining players. Yet, in another implementation, it may be desirable to increase the zone to include more and more players in a viral fashion, inducing excitement throughout the entire floor. In this case, the initial players who were included in the zone activity gains additional advantage of being able to enjoy the zone privilege for a longer amount of time compared to latter induced members.

Notification

Participants may be notified of their status at 450. In one embodiment, all participants that were eligible before the zone modification are transmitted a notification notifying them of their current eligibility. In another embodiment, only currently eligible participants are transmitted a notification. The notification may be transmitted to the players through any known methods, such as a text message to the mobile gaming device, a flashing and/or colored indicator at the gaming device, pop-up message at the gaming device, or any other notification means. For example, a flashing green indicator on the gaming device's screen may indicate that a participant is still eligible to play the game while a steady red indicator may indicate that a participant is no longer eligible. Audible tones, sound effects or even music clips may also be used to indicate status. Various combinations of notifications may be possible. In one embodiment, the participant may be given the option to select how they would like to receive the notification.

End of Zone Activity

A determination of whether an ending trigger has been detected may be made at 460. A trigger condition may be time-based (i.e., the zone-based event expires after five (5) minutes, and the like), event-based (i.e., terminate the zone-based activity when a player hits a jackpot, when there is less than three (3) remaining players after a zone reduction, when there is more than 100 players after a zone expansion, when there is at least 10 zone modification iterations, and the like), or randomly chosen condition at some arbitrary point in time. If an ending trigger has been detected at 460, the participants may be notified of the winners and prizes at 470. If the ending trigger is not detected at 460, the method 400 may continue to monitor and save player activities at 420.

Zone Modification Examples

Figure 5A:
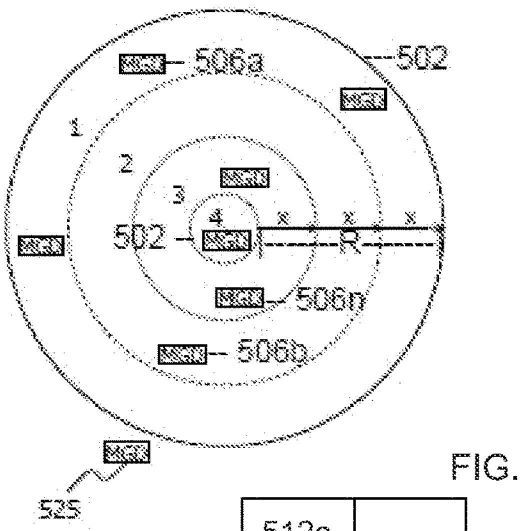
FIGS. 5A-5D illustrate example zone configurations and zone reductions.

FIGS. 5A-5D illustrate example zone configurations and zone reductions. FIG. 5*a* illustrates an example circular zone. The circular zone is denoted by solid line 502. It has radius R and is centered around gaming device 504, which is also the focus. As mentioned previously, the focus is not restricted to a gaming device but can be selected to be any point on the casino floor. Located inside the zone 502 are gaming devices 506*a-n* and located outside the zone 502 is gaming device 525. In this example, only participants associated with gaming devices located within the zone 502 at the initiation of the game are eligible for an award. In another embodiment, only players outside the zone 502 are eligible for an award. In yet another implementation, only players within a predefine proximity to the zone 502 are eligible to participate in the zone activity.

In one example, as the zone is modified, the circular zone may be decreased. The radius R may be decreased by small segments, as illustrated by letter "x". This has the effect of sequentially removing annular regions 1, 2, 3, indicated in the figure with dotted lines, from the zone. In one embodiment, the radius may be decreased by any length and need not be the same length. This allows greater variability in the evolution of the zone.

The decrements of the radium may occur at time intervals, regular, irregular, predefined, or based on predefined conditions. As the zone area is reduced, gaming devices may be eliminated from the zone 502, and thus the number of eligible participants is reduced. A trigger condition may interrupt this process at any step, depending on the zone request parameters. Similarly, the order of the removal of the annular regions does not need to proceed from the perimeter of the zone inward. Any order can be chosen, either randomly or predefined.

Figure 5B:
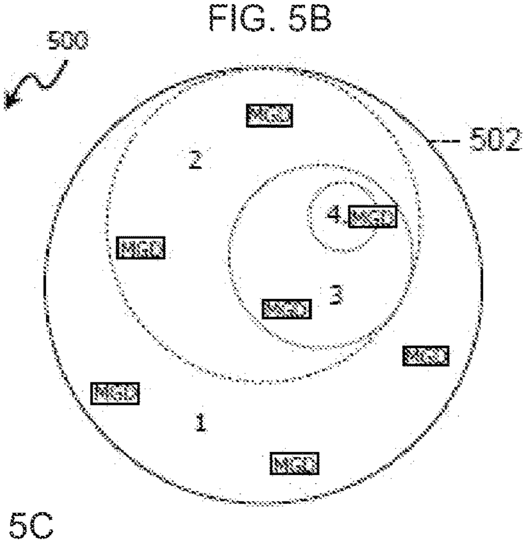

FIG. 5*b* illustrates another example circular zone having the focus centered on an arbitrary point on the casino floor. In this implementation, a zone 502 reduction process may take place where the future zone is within the boundary of the current zone 502.

Zone modification is also illustrated by illustrating a decrease the circular zone 502. In this embodiment the zone 502 is decreased by a specified area. The resulting area is then used to create a reduced circular zone, formed entirely within the zone 502. The focus of the reduced zone is different than the focus of the zone illustrated in FIG. 5*a*. The location of the new focus can be chosen using any method with the restriction that the reduced zone falls entirely within zone 502. With this embodiment, eligible participants may not be able to determine the location of the reduced zone.

Figure 5C:
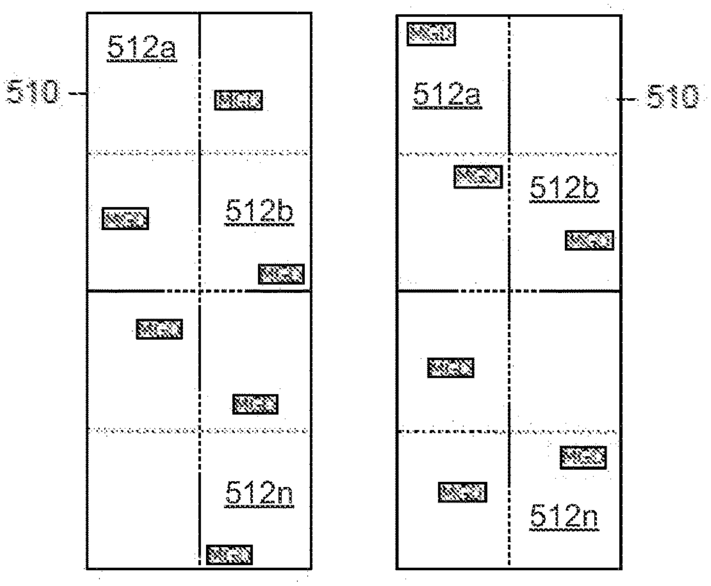

FIG. 5*c* illustrates an example zone consisting of two separate, non-contiguous areas. In this example each zone 510 has a rectangular shape. However, the shape of the zone is not meant to be limiting as any shape may be used. Additionally, the area of each zone 510 may be different.

As illustrated in FIG. 5*c*, each zone 510 may have quadrilateral sections 512*a-n*, indicated by dotted lines. To modify the zone 510, each quadrilateral section may be removed sequentially to decrease the zone 510 size. The sections may be removed in any order and/or multiple sections may be removed simultaneously. For example, section 512*a* may be removed prior to or simultaneously with 512*b*. Additionally, the time intervals between section removal can be the same or different, based on an ordered sequence, or at random intervals.

Figure 5D:
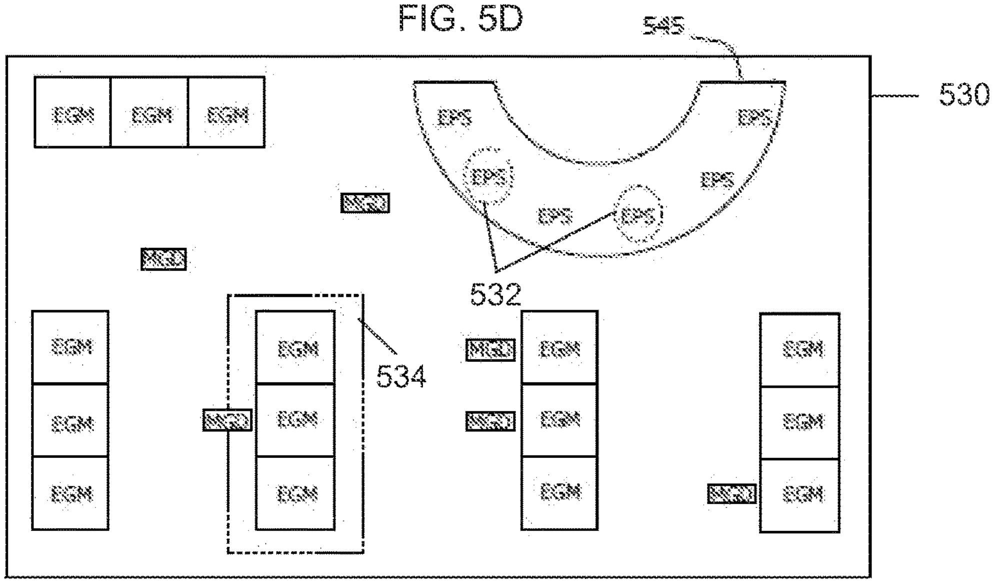

FIG. 5*d* illustrates a random-type of zone 530. In this embodiment, an area around one group of gaming machines was omitted, as indicated by dashed line 534, thereby creating a "holes" in the zone 530. In addition, FIG. 5*d* illustrates two player stations 532 at a gaming table 545 that is omitted from the zone 530. The ability to create this type of zone is advantageous when, for example, one or more gaming machines are inoperative (e.g., players not betting enough, or not otherwise eligible). Alternatively, if two player stations are unoccupied when the activity begins, the players may not be permitted to participate in the gaming activity.

While embodiments and applications of this invention have been shown and described, it would be apparent to those skilled in the art having the benefit of this disclosure that many more modifications than mentioned above are possible without departing from the inventive concepts herein.

What is claimed is:

1. A method for configuring a zone-based gaming activity within a gaming establishment, the method comprising:

setting a location within the gaming establishment for the zone-based gaming activity, the location being at least one defined region within the gaming establishment;

configuring a virtual gaming zone formed from a geographic position being a focus randomly selected in the location within the gaming establishment for the zone-based gaming activity based on a random number generated by a random number generator;

identifying one or more gaming devices that are within the virtual gaming zone eligible to participate in the zone-based gaming activity;

enlarging the virtual gaming zone from the geographic position when the one or more gaming devices identified to be eligible to participate in the zone-based gaming activity is below a threshold, resulting in an enlarged virtual gaming zone; and permitting the one or more gaming devices that are identified within the enlarged virtual gaming zone to participate in the zone-based gaming activity.

2. The method of claim 1, further comprising selecting the enlarged virtual gaming zone based on data retrieved from a configuration database.

3. The method of claim 1, further comprising selecting the enlarged virtual gaming zone based on eligibility data transmitted from the one or more gaming devices.

4. The method of claim 1, wherein the threshold comprises at least one of a range of participating gaming devices, and a specified number of participating gaming devices.

5. The method of claim 1, further comprising determining the one or more gaming devices to participate in the zone-based gaming activity based on one of whether the one or more gaming devices have been active for a period of time, memberships of players at the one or more gaming devices, and play history of players at the one or more gaming devices.

6. The method of claim 1, further comprising enlarging the virtual gaming zone at a predetermined rate.

7. The method of claim 1, further comprising displaying on the one or more gaming devices an indicator when the one or more gaming devices are determined to be eligible for the virtual gaming zone.

8. A gaming system for configuring a zone-based gaming activity within a gaming establishment, the gaming system comprising:

a plurality of gaming devices; and at least one server coupled to the gaming devices, and having at least one processor and memory storing a plurality of configuration parameters and computer programs, which, when executed, cause the at least one processor to at least:

initiate a zone request based on the configuration parameters, configure a virtual gaming zone formed from a geographic position focused about a location randomly selected in the gaming establishment based on a random number generated by a random number generator and the zone request, initiate the zone-based gaming activity within the gaming establishment defined by the virtual gaming zone with at least one of the gaming devices within the virtual gaming zone that are eligible to participate in the zone-based gaming activity, enlarge the virtual gaming zone from the geographic position when the at least one of the gaming devices that are eligible to participate in the zone-based gaming activity is below a threshold, resulting in an enlarged virtual gaming zone, and initiate the at least one of the gaming devices within the enlarged virtual gaming zone to participate in the zone-based gaming activity.

9. The gaming system of claim 8, wherein the computer programs, when executed, cause the at least one processor to select the enlarged virtual gaming zone based on the configuration parameters retrieved.

10. The gaming system of claim 8, wherein the computer programs, when executed, cause the at least one processor to select the enlarged virtual gaming zone based on eligibility data transmitted from the at least one of the gaming devices.

11. The gaming system of claim 8, wherein the threshold comprises at least one of a range of participating gaming devices, and a specified number of participating gaming devices.

12. The gaming system of claim 8, wherein the computer programs, when executed, cause the at least one processor to determine the at least one of the gaming devices to participate in the zone-based gaming activity based on one of whether the at least one of the gaming devices have been active for a period of time, memberships of players at the at least one of the gaming devices, and play history of players at the at least one of the gaming devices.

13. The gaming system of claim 8, wherein the computer programs, when executed, cause the at least one processor to enlarge the virtual gaming zone at a predetermined rate.

14. The gaming system of claim 8, wherein the computer programs, when executed, cause the at least one of the gaming devices to display an indicator when the at least one of the gaming devices are determined to be eligible for the virtual gaming zone.

15. A non-transitory computer-readable medium comprising configuration parameters and computer programs for conducting a zone-based gaming activity within a gaming establishment that includes a plurality of gaming devices and at least one server coupled to the gaming devices, the at least one server having at least one processor, and the computer programs, which, when executed, cause the at least one processor to perform the steps of:

setting a location in a define region within the gaming establishment for the zone-based gaming activity based on the configuration parameters;

forming a virtual gaming zone from a geographic position randomly selected about the location based on a random number generated by a random number generator;

determining a subset of the plurality of gaming devices within the virtual gaming zone that are eligible to participate in the zone-based gaming activity; and enlarging the virtual gaming zone from the geographic position when the subset of the plurality of gaming devices eligible to participate in the zone-based gaming activity is below a threshold, resulting in an enlarged virtual gaming zone that includes a different subset of the plurality of gaming devices.

16. The non-transitory computer-readable medium of claim 15, wherein the computer programs, when executed, cause the at least one processor to perform the step of selecting the enlarged virtual gaming zone based on data retrieved from a configuration database.

17. The non-transitory computer-readable medium of claim 15, wherein the computer programs, when executed, cause the at least one processor to perform the step of selecting the enlarged virtual gaming zone based on eligibility data transmitted from the different subset of the plurality of gaming devices.

18. The non-transitory computer-readable medium of claim 15, wherein the threshold comprises at least one of a range of participating gaming devices, and a specified number of participating gaming devices.

19. The non-transitory computer-readable medium of claim 15, wherein the computer programs, when executed, cause the at least one processor to perform the step of determining the different subset of the plurality of gaming devices to participate in the zone-based gaming activity based on one of whether the different subset of the plurality of gaming devices have been active for a period of time, memberships of players at the different subset of the plurality of gaming devices, and play history of players at the different subset of the plurality of gaming devices.

20. The non-transitory computer-readable medium of claim 15, wherein the computer programs, when executed, cause the at least one processor to perform the step of enlarging the virtual gaming zone at a predetermined rate.

* * * * *